(12) United States Patent
Toida et al.

(10) Patent No.: US 9,280,223 B2
(45) Date of Patent: Mar. 8, 2016

(54) IMAGING APPARATUS AND CONTINUOUS SHOOTING IMAGING METHODS USING A CONTINUOUS TOUCH USER INPUT

(71) Applicant: Olympus Corporation, Shibuya-ku, Tokyo (JP)

(72) Inventors: Maki Toida, Toyko (JP); Izumi Sakuma, Musashino (JP); Kensei Ito, Sagamihara (JP)

(73) Assignee: Olympus Corporation, Tokyo (JP)

( * ) Notice: Subject to any disclaimer, the term of this patent is extended or adjusted under 35 U.S.C. 154(b) by 362 days.

(21) Appl. No.: 13/749,193

(22) Filed: Jan. 24, 2013

(65) Prior Publication Data
US 2013/0194215 A1    Aug. 1, 2013

(30) Foreign Application Priority Data
Jan. 27, 2012   (JP) .................................. 2012-015485

(51) Int. Cl.
   *G06F 3/041*      (2006.01)
   *G06F 3/0488*     (2013.01)
   *H04N 5/232*      (2006.01)

(52) U.S. Cl.
   CPC .............. *G06F 3/041* (2013.01); *G06F 3/0488* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 6,249,606 | B1 * | 6/2001 | Kiraly et al. | 382/195 |
| 2009/0309990 | A1 * | 12/2009 | Levoy et al. | 348/222.1 |
| 2009/0322893 | A1 * | 12/2009 | Stallings et al. | 348/222.1 |
| 2010/0020222 | A1 * | 1/2010 | Jones et al. | 348/333.02 |
| 2010/0194920 | A1 * | 8/2010 | Gai et al. | 348/231.2 |
| 2012/0200721 | A1 * | 8/2012 | Hara et al. | 348/208.4 |
| 2012/0249853 | A1 * | 10/2012 | Krolczyk et al. | 348/333.01 |
| 2012/0257071 | A1 * | 10/2012 | Prentice | 348/220.1 |
| 2014/0226053 | A1 * | 8/2014 | Winer et al. | 348/333.05 |

FOREIGN PATENT DOCUMENTS

| | | |
|---|---|---|
| JP | 2005-102106 | 4/2005 |
| JP | 2010-141582 | 6/2010 |
| JP | 2010-226319 | 10/2010 |
| JP | 2011-015127 | 1/2011 |
| JP | 2011-188057 | 9/2011 |
| JP | 2012-010061 | 1/2012 |
| JP | 2012-160850 | 8/2012 |

OTHER PUBLICATIONS

Office Action from corresponding Japanese Patent Application Serial No. 2012-015485, mailed May 27, 2014 (4 pgs.), with translation (4 pgs.).

\* cited by examiner

*Primary Examiner* — Kent Chang
*Assistant Examiner* — Benjamin Morales Fernande
(74) *Attorney, Agent, or Firm* — John C. Pokotylo; Straub & Pokotylo

(57) ABSTRACT

An imaging apparatus includes an imaging part for capturing a subject image, a touch panel for acquiring a touch position input by a user, and a control part for controlling an imaging operation performed by the imaging part. The control part acquires the touch position to cause the imaging part to perform the imaging operation each time the touch position is displaced on the touch panel by a predetermined amount repeatedly during a continuous touch user input.

1 Claim, 21 Drawing Sheets

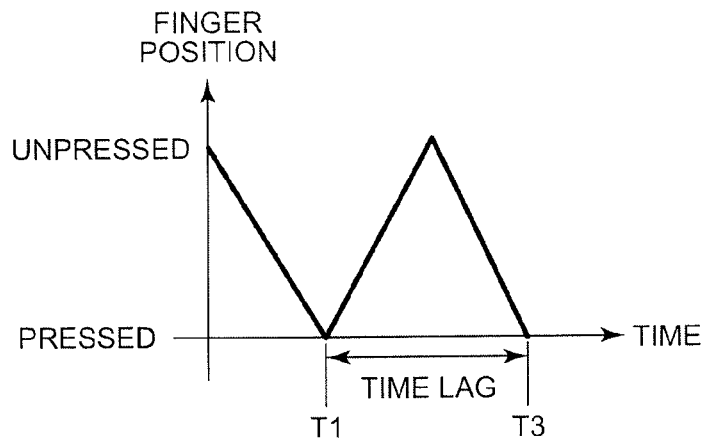
FIG. 7A
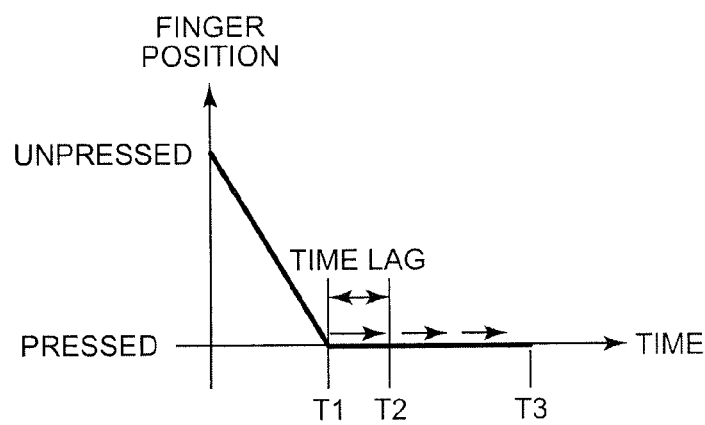
FIG. 7B
FIG. 8
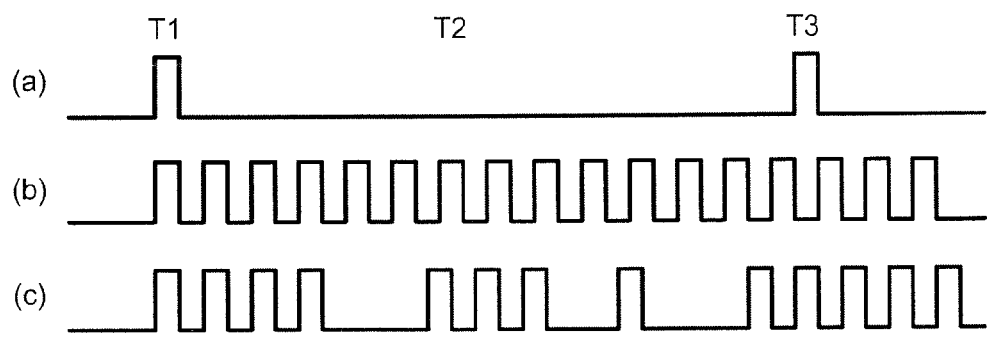

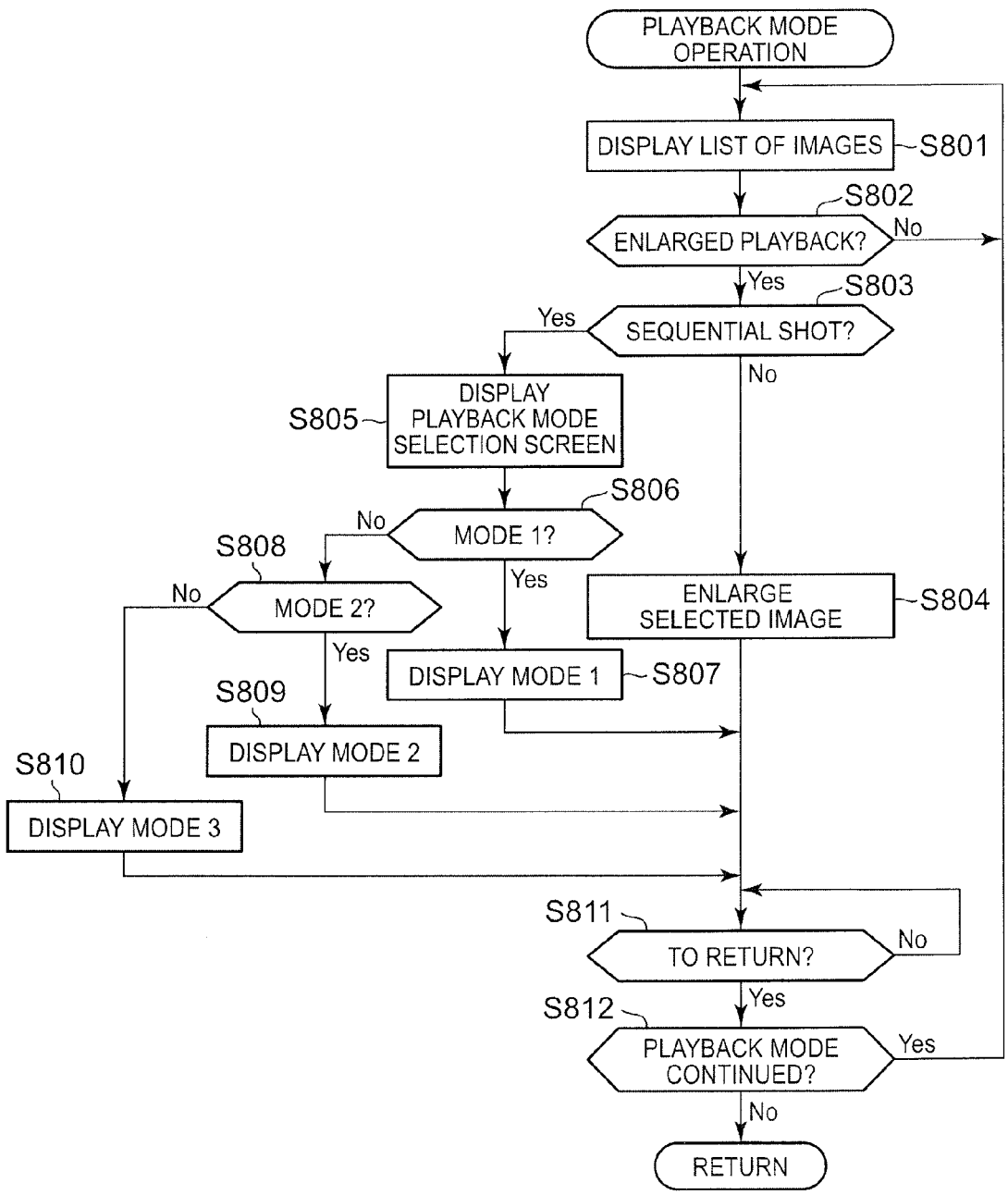

IMAGING APPARATUS AND CONTINUOUS SHOOTING IMAGING METHODS USING A CONTINUOUS TOUCH USER INPUT

Benefit is claimed, under 35 U.S.C. §119, to the filing date of prior Japanese Patent Applications No. 2012-015485, filed on Jan. 27, 2012. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and an imaging method.

2. Description of Related Art

In general, when taking a picture of an actively moving subject or a subject moving unpredictably, missing the opportunity to get the best shot is possible. On the other hand, for example, continuous shooting, i.e., sequential shooting, may be performed to avoid missing the opportunity to get the best shot. However, with sequential shooting, a massive number of photos other than the best shot are acquired. Therefore, Japanese Patent Application Publication No. 2010-226319 discloses a technique for displaying photos obtained in the sequential shooting as thumbnails to permit a user to select one or more desired photos.

SUMMARY OF THE INVENTION

According to one aspect of the present invention, an imaging apparatus includes an imaging part for capturing a subject image, a touch panel for acquiring a touch position input by a user, and a control part for controlling an imaging operation performed by the imaging part, wherein the control part acquires the touch position to cause the imaging part to perform an imaging operation each time the touch position is displaced by a predetermined amount defined on the touch panel repeatedly while the touch panel is continuously being touched.

BRIEF DESCRIPTION OF THE DRAWINGS

FIG. 7A is a chart for describing the timings of continuous shooting through a release button.

FIG. 7B is a chart for describing the timings of continuous shooting according to the first embodiment.

FIG. 8 is a chart for describing the timings of continuous shooting according to the first embodiment.

FIG. 24 is a flowchart representing an example of another playback mode operation according to each embodiment.

DETAILED DESCRIPTION

[First Embodiment]

Figure 1:
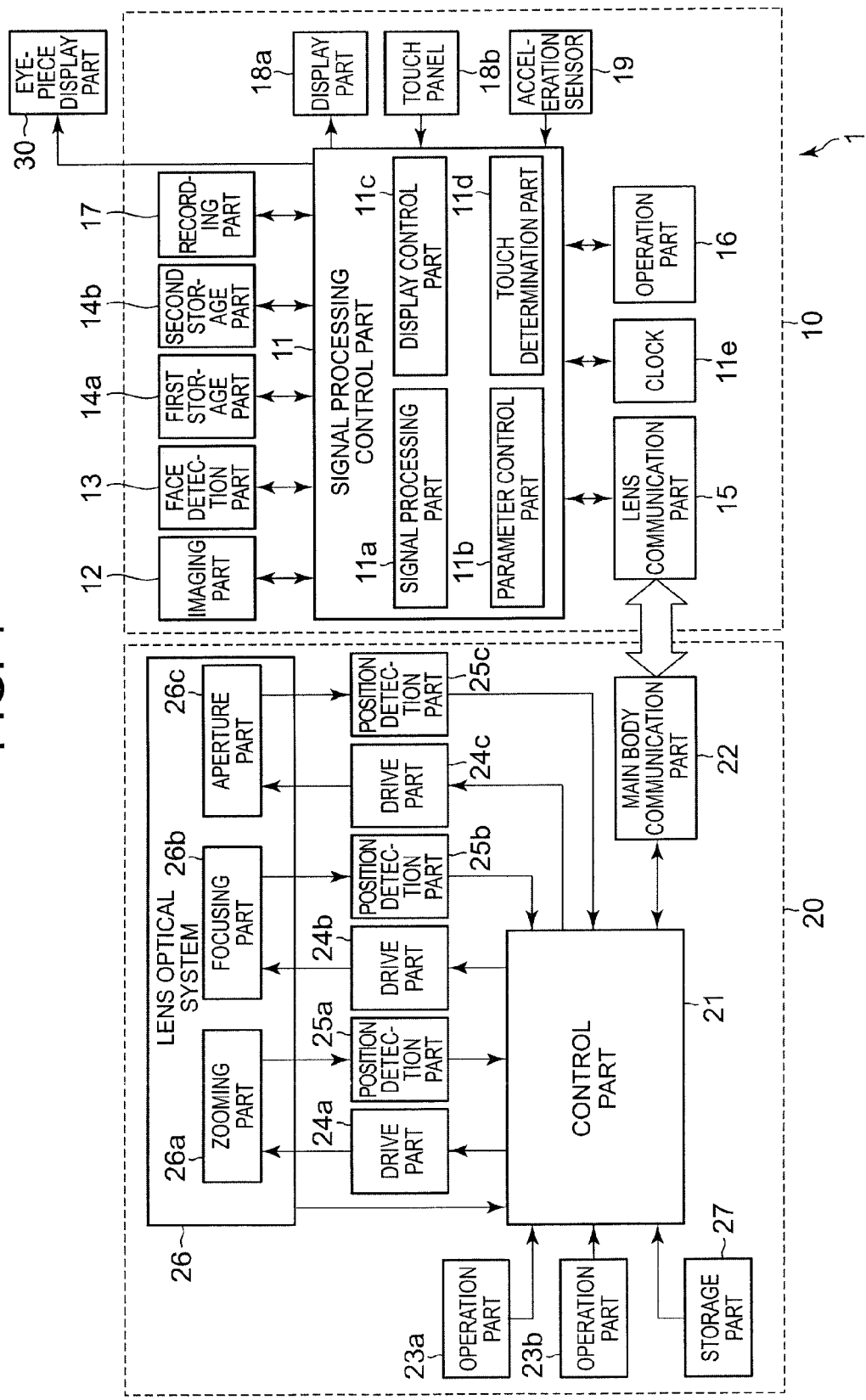
FIG. 1 is a block diagram showing a configuration example of a digital camera according to each embodiment of the present invention.

A first embodiment of the present invention will be described with reference to the accompanying drawings. FIG. 1 shows a block diagram schematically showing a digital camera 1 as an imaging apparatus according to the embodiment. The digital camera 1 is, for example, an interchangeable lens camera. Note that the camera does not have to be of the interchangeable lens type, and the technique of the present invention can, of course, be applied to a fixed-lens compact camera, a portable device with shooting functions, and the like. If an interchangeable lens camera is used, various lenses can be used to take photos according to the subject to be shot. Therefore, users or the like who want to take pictures of everything around them clearly as well as common subjects such as persons and landscape often use such a camera.

Expected users of the present invention include the users of such an interchangeable lens camera.

The interchangeable lens digital camera 1 has a camera body 10 and a lens 20. A user mounts a desired lens 20 on the camera body 10 to take pictures. The lens 20 guides a subject image to an imaging part 12 provided in the camera body 10 to be described later. Here, description is made on condition that the lens 20 is a zoom lens. However, the lens 20 is not limited to the zoom lens, and it may be a fixed focal length lens. The lens 20 has a lens optical system 26. A zooming part 26a, a focusing part 26b, and an aperture part 26c are provided in the lens optical system 26. The zooming part 26a moves the positions of two or more lens elements to achieve the zoom function. The focusing part 26b moves a focusing lens to focus the subject image on the imaging part 12. The aperture part 26c adjusts a size of the aperture opening to adjust the amount of light to be guided to the imaging part 12 during a shutter release.

The lens 20 has a control part 21 for controlling the operation of the zooming part 26a, the focusing part 26b, the aperture part 26c, and the like. The lens 20 also has a position detection part 25a for detecting the position of each element in the zooming part 26a, a position detection part 25b for detecting the position of each element in the focusing part 26b, and a position detection part 25c for detecting the position of each element in the aperture part 26c. Further, the lens 20 has a drive part 24a for driving a motor or the like in the zooming part 26a, a drive part 24b for driving a motor or the like in the focusing part 26b, and a drive part 24c for driving a motor or the like in the aperture part 26c. In addition, the lens 20 has a storage part 27 with control data and a program recorded therein, and a main body communication part 22 for communicating with the camera body 10.

The control part 21 uses the output of the position detection part 25a to activate the drive part 24a to drive the zooming part 26a based on the control data and the program recorded in the storage part 27, and various control parameters acquired through the main body communication part 22. The control part 21 also uses the output of the position detection part 25b to activate the drive part 24b to drive the focusing part 26b based on the control data and the program recorded in the storage part 27, and various control parameters acquired through the main body communication part 22. Further, the control part 21 uses output of the position detection part 25c to activate the drive part 24c to drive the aperture part 26c based on the control data and the program recorded in the storage part 27, and various control parameters acquired through the main body communication part 22.

Further, the lens 20 has an operation part 23a and an operation part 23b. The operation part 23a and the operation part 23b are operation parts through which operations of the zooming part 26a, the focusing part 26b, the aperture part 26c, and the like are input. The user operates the operation part 23a and the operation part 23b to enable manual adjustments of the operations of the zooming part 26a, the focusing part 26b, the aperture part 26c, and the like. The user can operate these operation part 23a and operation part 23b to carry out lens operations and the like for photography obsessed with an obscuring (blurring) effect and the like. For example, the operation part 23a and the operation part 23b have a ring portion rotating along a lens barrel. A shift operation is also enabled by using the ring portion in a manner to be described later. For example, the rotation operation corresponds to input of the operation part 23a and the shift operation corresponds to input of the operation part 23b. The operation part 23a and the operation part 23b may also be operating switches or the like.

On the other hand, the camera body 10 has a signal processing control part 11 for processing various signals to control each part of the camera body 10. The signal processing control part 11 is, for example, made up of an integrated circuit. A signal processing part 11a capable of image processing necessary to display and record images is formed in this signal processing control part 11. A parameter control part 11b for controlling various parameters is also provided in the signal processing control part 11. Further, a display control part 11c for controlling the display of an image on a display part 18a or an eyepiece display part 30 to be described later, and a touch determination part 11d for processing input through a touch panel 18b to be described later are provided in the signal processing control part 11.

The camera body 10 has the imaging part 12. The imaging part 12 carries out an imaging operation. In other words, the imaging part 12 converts a subject image coming from the interchangeable lens into an electric signal to generate an image signal. The imaging part 12 outputs the generated image signal to the signal processing control part 11.

The camera body 10 has the display part 18a for displaying an image. The display part 18a has, for example, a liquid crystal display panel. Further, the camera body 10 is so configured that the eyepiece display part 30 for displaying an image can be mounted thereon. The eyepiece display part 30 has a small liquid crystal panel, an organic EL panel, or the like. The eyepiece display part 30 is to enlarge the displayed image through a dedicated optical system to enable the user to view the image. Since the user can watch the image as if to look through a finder, without the influence of outside light. Further, the eyepiece display part 30 is so configured that this dedicated optical system can be adjusted to adjust the diopter scale according to the user's eyesight. This diopter adjustment enables the user to watch the image well regardless of the user's eyesight. The display part 18a and the eyepiece display part 30 operate under the control of the display control part 11c in the signal processing control part 11.

An operation part 16, such as switches and the like, for receiving input generated in accordance with a user's various operations is provided in the camera body 10. What is particularly important in a photograph device is operations upon shooting. For example, a release button for still image shooting is typically arranged in a position operable with the index finger of the right hand. The user can operate this release button to have the digital camera 1 carry out a shooting operation. Further, switches, a dial, and the like may receive user entered changes of shooting parameters, such as the shutter speed, the aperture, the exposure correction, the sensitivity setting, and the focusing position, and are provided on the operation part 16.

Further, the camera body 10 has the touch panel 18b. This touch panel 18b is, for example, provided on the display part 18a. The touch panel 18b also receives a user's instructions. For example, the user can touch a position corresponding to an icon displayed on the display part 18a to carry out an operation of the digital camera 1. Further, touch panel 18b may receive, from the user, a continuous shooting instruction according to the embodiment. A signal generated by the touch panel 18b with a user's touch is output to the touch determination part 11d in the signal processing control part 11, and the signal is first processed in the touch determination part 11d.

The camera body 10 has a first storage part 14a and a second storage part 14b. The first storage part 14a is, for example, a ROM storing a program or the like used for control by the signal processing control part 11. The second storage part 14b is, for example, a RAM such as an SDRAM for temporarily storing the processing results of the signal processing control part 11. Further, a recording part 17 for recording image data shot and generated is provided in the camera body 10. This recording part 17, provided as a common recording medium, is connected removably to the camera body 10. Further, the camera body 10 has a face detection part 13 for detecting the face portion of a subject based on an image signal acquired by the imaging part 12. Further, the camera body 10 has an acceleration sensor 19 for detecting the attitude of the camera body 10. Further, the camera body 10 has a lens communication part 15 for communicating with the main body communication part 22 of the lens 20. Instructions of the operation of the lens 20 from the camera body 10 to the lens 20, transfer of information on the state of the lens 20 from the lens 20 to the camera body 10, and the like are performed through the lens communication part 15 and the main body communication part 22. Further, the camera body 10 has a clock 11e for adding data on the shooting date and time to a shot image.

The signal processing control part 11 operates according to a program stored in the first storage part 14a. The signal processing control part 11 is so configured that the signal processing part 11a creates a preview image based, for example, on an image signal input from the imaging part 12. This enables the user to take a picture while viewing the display part 18a and/or the eyepiece display part 30. The display control part 11c in the signal processing control part 11 displays it as a live view on the display part 18a and/or the eyepiece display part 30. Further, at the time of shooting, the signal processing part 11a creates a recording image based on an image signal provided from the imaging part 12, for example, according to the input from the operation part 16, and records this recording image in the recording part 17. Further, for example, the parameter control part 11b performs shooting control such as to make an in-focus evaluation based on the contrast of a face portion detected in the face detection part 13, to detect a defocus amount based on a phase difference signal, and to adjust various parameters, such as adjusting the exposure value. The touch determination part 11d in the signal processing control part 11 acquires a signal corresponding to a user's instruction through the touch panel 18b.

Figure 2:
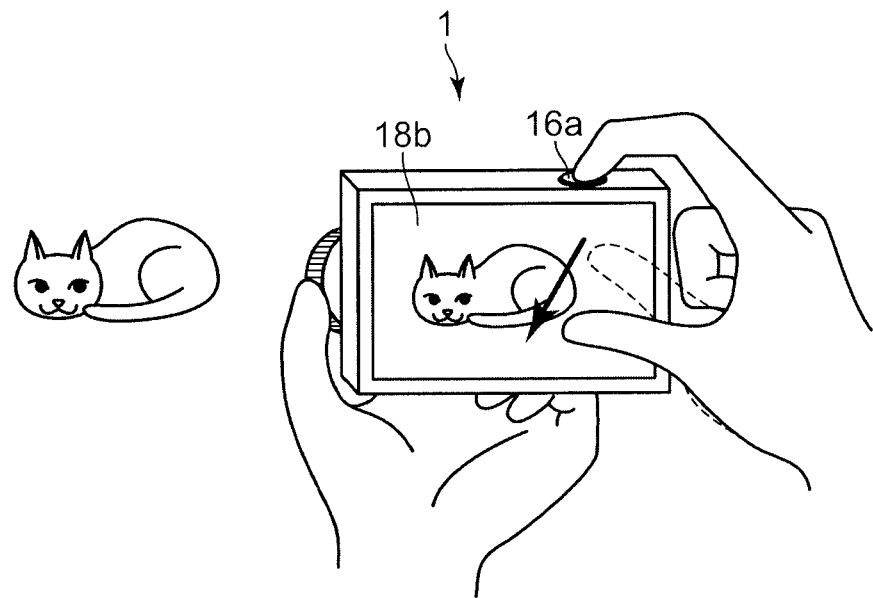
FIG. 2 is a schematic view showing a state of operating the digital camera according to a first embodiment.
Figure 3:
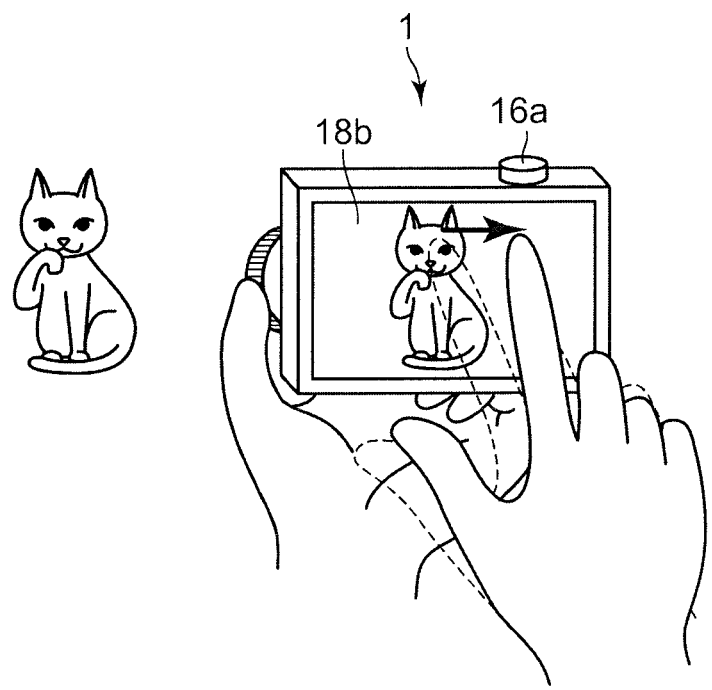
FIG. 3 is a schematic view showing another state of operating the digital camera according to the first embodiment.

The operation of the digital camera 1 according to an example embodiment will be described. This digital camera 1 can ensure that shooting is performed without missing the opportunity to get the best shot. For example, as shown in FIG. 2, the user slides his or her finger on the touch panel 18b while pressing a release button 16a as one of the elements on the operation part 16. The digital camera 1 determines whether the finger is being slid on the touch panel 18b, i.e., whether the touch position is displaced by a predetermined amount, and carries out a shooting operation only when the finger is being slid. Further, for example, as shown in FIG. 3, the digital camera 1 may be so configured that the same operation will be carried out only with the operations on the touch panel 18b without using the release button 16a. In other words, the digital camera 1 is configured to carry out a shooting operation when the touch panel 18b is touched for the first time (so-called touch release), and after that, only when it is detected that a finger is slid on the touch panel 18b. Thus, the digital camera 1 according to the embodiment is configured to perform continuous shooting without changing the conventional shooting operation through the release button 16a as shown in FIG. 2 or the conventional touch-release shooting operation as shown in FIG. 3 according to the subsequent slide operation of the touch position.

Figure 4:
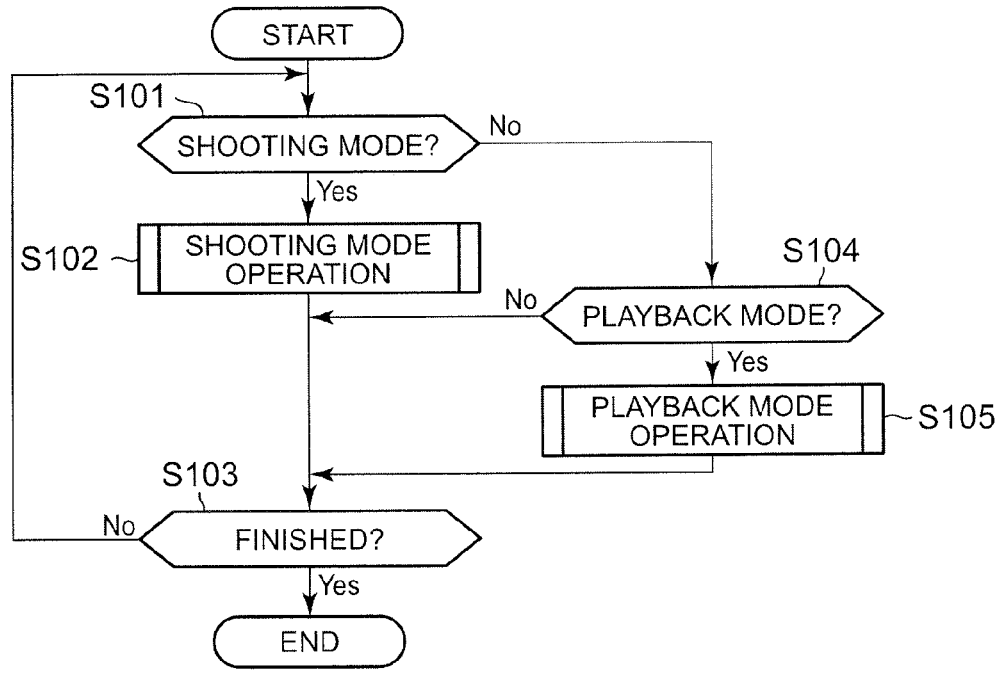
FIG. 4 is a flowchart representing an example of a main flow according to each embodiment.
Figure 5:
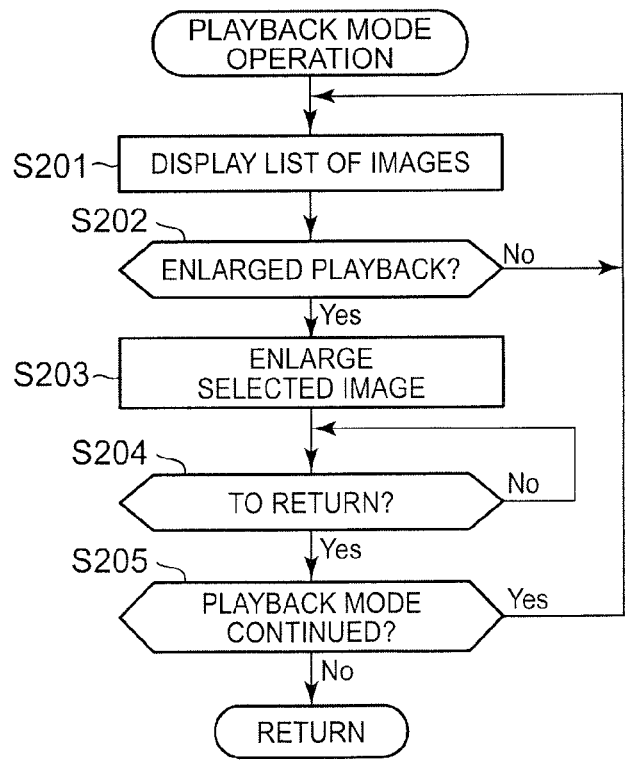
FIG. 5 is a flowchart representing an example of a playback mode operation according to each embodiment.
Figure 6:
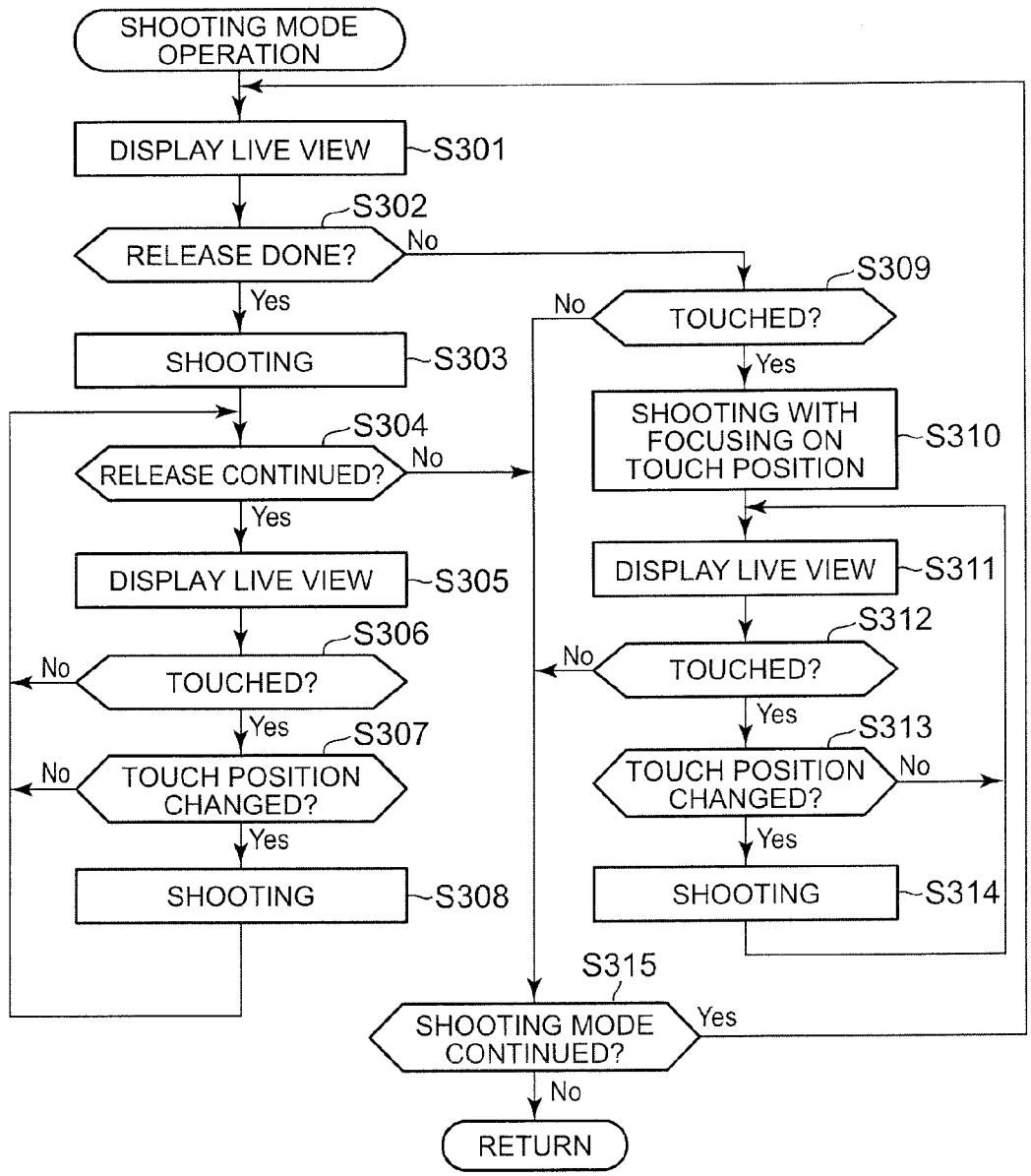
FIG. 6 is a flowchart representing an example of a shooting mode operation according to the first embodiment.

The operation of the digital camera 1 according to this first example embodiment will be described with reference to the flowcharts of FIGS. 4-6. FIG. 4 shows a flowchart of main processing performed by the signal processing control part 11. In step S101, the signal processing control part 11 determines whether the mode is a shooting mode. For example, the signal processing control part 11 determines whether a mode switch on the operation part 16 is in a position indicative of a shooting mode to determine whether the mode is the shooting mode.

When determining in step S101 that the mode is the shooting mode, the signal processing control part 11 performs in step S102 a shooting mode operation to be described later with reference to FIG. 6. After completion of the shooting mode operation, the signal processing control part 11 determines whether the processing is finished. For example, the signal processing control part 11 determines whether a main switch of the operation part 16 is pressed to determine whether the processing is finished. When determining in step S103 that the processing is finished, the signal processing control part 11 ends the processing. When determining in step S103 that the processing is not finished, the processing returns to step S101.

When determining in step S101 that the mode is not the shooting mode, the signal processing control part 11 determines in step S104 whether the mode is a playback mode. For example, the signal processing control part 11 determines whether the mode switch on the operation part 16 is in a position indicative of the playback mode to determine whether the mode is the playback mode. When it is determined in step S104 that the mode is not the playback mode, the processing proceeds to step S103. When it is determined in step S104 that the mode is the playback mode, the signal processing control part 11 performs in step S105 a playback mode operation to be described later with reference to FIG. 5. After completion of the playback mode operation, the processing proceeds to step S103.

The playback mode operation will be described with reference to a flowchart shown in FIG. 5. In step S201, the signal processing control part 11 displays, on the display part 18a, a list of images recorded in the recording part 17. In step S202, the signal processing control part 11 determines whether enlarged playback is selected. For example, when one of images listed in the display part 18a is selected on the touch panel 18b, it is assumed that the enlarged playback of the selected image is selected. When it is determined in step S202 that the enlarged playback is not selected, the processing returns to step S201. On the other hand, when it is determined in step S202 that the enlarged playback is selected, the signal processing control part 11 makes an enlarged display of the selected image on the display part 18a in step S203.

In step S204, the signal processing control part 11 determines whether returning to the display of the image list is selected. The processing repeats step S204 unless returning to the display of the image list is selected in step S204. On the other hand, when it is determined in step S204 that returning to the display of the image list is selected, the processing proceeds to step S205. In step S205, the signal processing control part 11 determines whether the playback mode is continued. When it is determined that the playback mode is continued, the processing returns to step S201. On the other hand, when it is determined that the playback mode is not continued, the processing returns to the main flow (at step S103) described with reference to FIG. 4.

The shooting mode operation will be described with reference to a flowchart shown in FIG. 6. In step S301, the signal processing control part 11 displays a live view on the display part 18a (or on both the display part 18a the eyepiece display part 30, if one is attached). In other words, the signal processing control part 11 processes an image acquired by the imaging part 12, and displays a preview image after being subjected to the processing on the display part 18a in real time. In step S302, the signal processing control part 11 determines whether a release is performed. For example, the signal processing control part 11 determines whether the release button 16a as one of the elements on the operation part 16 is pressed. When determining in step S302 that a release is performed, the signal processing control part 11 performs a shooting operation in step S303. In other words, for example, the signal processing control part 11 causes the imaging part 12 to perform an imaging operation to acquire an image signal from the imaging part 12, performs necessary processing on the image signal, and records image data in the recording part 17.

In step S304, the signal processing control part 11 determines whether release is continued. When it is determined that release is not continued, the processing proceeds to step S315, discussed later. On the other hand, when it is determined that release is continued, the signal processing control part 11 displays in step S305 a live view on the display part 18a (or on both the display part 18a the eyepiece display part 30, if one is attached). The signal processing control part 11 determines in step S306 whether the touch panel 18b is touched. When it is determined in step S306 that the touch panel 18b is not touched, the processing returns to step S304. On the other hand, when it is determined in step S306 that the touch panel 18b is touched, the signal processing control part 11 compares in step S307 the current touch position with the touch position detected at the previous shooting to determine whether the touch position is changed by a predetermined amount. When it is determined in step S307 that the touch position is not changed by the predetermined amount, the processing returns to step S304. On the other hand, when it is determined in step S307 that the touch position is changed by the predetermined amount, the signal processing control part 11 performs a shooting operation in step S308. In other words, the signal processing control part 11 causes the imaging part 12 to perform an imaging operation to acquire an image signal from the imaging part 12, and processes the image signal. After that, the processing returns to step S304.

When determining in step S302 that release is not done, the signal processing control part 11 determines in step S309 whether the touch panel 18b is touched. When it is determined in step S309 that the touch panel 18b is not touched, the processing proceeds to step S315, discussed later. On the other hand, when it is determined in step S309 that the touch panel 18b is touched, the signal processing control part 11 performs a shooting operation after operating the focusing part 26b in step S310 to focus on a subject displayed on the display part 18a in a position corresponding to the touched position. In other words, the signal processing control part 11 causes the imaging part 12 to perform an imaging operation to acquire an image signal from the imaging part 12, and processes the image signal.

In step S311, the signal processing control part 11 displays a live view on the display part 18a (or on both the display part 18a the eyepiece display part 30, if one is attached). In step S312, the signal processing control part 11 determines whether the touch panel 18b is touched. When it is determined in step S312 that the touch panel 18b is not touched, the processing proceeds to step S315, described later. On the other hand, when it is determined in step S312 that the touch panel 18b is touched, the signal processing control part 11 compares in step S313 the current touch position with the touch position detected at the previous shooting to determine whether the touch position is changed by a predetermined amount. When it is determined in step S313 that the touch position is not changed by the predetermined amount, the processing returns to step S311. On the other hand, when it is determined in step S313 that the touch position is changed by the predetermined amount, the signal processing control part 11 performs a shooting operation in step S314. In other words, the signal processing control part 11 causes the imaging part 12 to perform an imaging operation to acquire an image signal from the imaging part 12, and processes the image signal. After that, the processing returns to step S311.

In step S315, the signal processing control part 11 determines whether the shooting mode is continued. When it is determined in step S315 that the shooting mode is continued, the processing returns to step S301. On the other hand, when it is determined in step S315 that the shooting mode is not continued, the processing returns to the main flow (at step S103) described with reference to FIG. 4.

During this shooting mode operation, in the loop processing from step S304 to step S308, for example, when a finger is slid by a predetermined amount on the touch panel 18b on condition that the release button is pressed as shown in FIG. 2, a shooting operation is performed, while when the finger remains stationary, no shooting operation is performed. In other words, shooting operations are performed one after another each time the touch position is moved by a predetermined amount while the touch position continues to be displaced. In other words, continuous shooting is performed while the touch position is changed by the predetermined amount. Further, like in the operations from step S304 to step S308, in the loop processing from step S311 to step S314, for example, when a finger is slid by a predetermined amount on the touch panel 18b on condition that the finger is placed on the touch panel 18b as shown in FIG. 3, a shooting operation is performed, but while when the finger remains stationary, no shooting operation is performed. Further, when the finger is lifted off the touch panel 18b, a sequence of continuous shooting operations are completed. In this example embodiment, the direction of displacement of the touch position is not particularly limited, and a shooting operation is performed when the touch position is moved in any direction.

According to the first example embodiment, there is provided the digital camera 1 capable of ensuring that shooting is performed without missing the opportunity to get the best shot. For example. FIG. 7A shows a schematic chart representing the positions of a finger pressing the release button, i.e., the amounts of pressing the release button when continuous shooting operations are performed only with release-button control. In FIG. 7A, the release button is pressed at time T1 and time T3, and the digital camera 1 performs shooting operations. Here, an unpressed condition of the release button occurs between time T1 and time T3. In other words, the release button changes from the pressed state to the unpressed state, and then changes back to the pressed state again. Thus, a time lag from time T1 to time T3 occurs between the two shooting operations.

In contrast to this (where the release button is pressed and released), FIG. 7B schematically shows a state of the positions of a finger continuing to press the release button 16a (or where another finger is slid on the touch panel 18b) in the case of the digital camera 1 according to the first example embodiment. As shown in FIG. 7B, the release button remains pressed after time T1. Here, when a finger is slid on the touch panel 18b, a shooting operation is performed. For example, the shooting operation can be performed at time T2. Thus, in the case shown in FIG. 7B, the time lag (from T1 to T2) is smaller than that (from T1 to T3) in the case shown in FIG. 7A. Because of this small time lag, the digital camera according to the embodiment can ensure that shooting operations can be performed without missing the opportunity to get the best shot. As a result, missing a photo of a desired scene because there is a gap between the shooting timing and timing intended by the user is prevented, or an unintended photo from being taken. (When movement of the subject is fast, a small time lag enables users to take intended photos. The signal processing control part 11 performs a focusing operation on the touch position portion of the shooting operation as shown in step S406.) Thus, in the embodiment, the two-dimensional space of the touch panel 18b is effectively used in the release operation, as well as the release button.

Further, in general, to prevent missing the opportunity to get a photo of a desired scene, photos may be taken in a sequential shooting mode. However, depending on the camera design, operations for starting the sequential shooting mode are generally troublesome for some users. Further, when shooting is performed sequentially in the sequential shooting mode, a massive number of photos other than those of the desired scene(s) are acquired. Such a massive number of shots waste the memory capacity and/or the battery. It is also troublesome for a user to select a necessary photo from among a massive number of photos. In contrast, the digital camera 1 according to the first example embodiment can receive a user's instruction to take only a desired photo(s) through the movement of the touch position on the touch panel 18b.

In the first example embodiment, since shooting is performed when the touch position is displaced by at least a predetermined distance, the shooting interval is changed according to the amount of movement of the touch position per unit time, i.e., according to the moving speed of the touch position. For example, FIG. 8 schematically shows shooting timings with time. FIG. 8A shows a case where the release button is repeatedly pressed as described with reference to FIG. 7A (in which desired photos may be missed), FIG. 8B shows a case where shooting is performed in a conventional sequential shooting mode (in which too many photos may be captured), and FIG. 8O shows a case of shooting according to the first example embodiment (in which desired photos are not missed, while avoiding capturing too many images). Here, the upper side in each diagram indicates shooting timing. As shown, according to the embodiment shown in FIG. 8C, shooting can be performed more often than the case of FIG. 8A. Further, according to the embodiment, shooting is performed intermittently as shown in FIG. 8C, rather than that shooting is performed continuously as shown in FIG. 8B. As a result, according to the embodiment, shooting can be carried out at appropriate timings without getting too many shots and without missing the opportunity to get the best shot.

Figure 9:
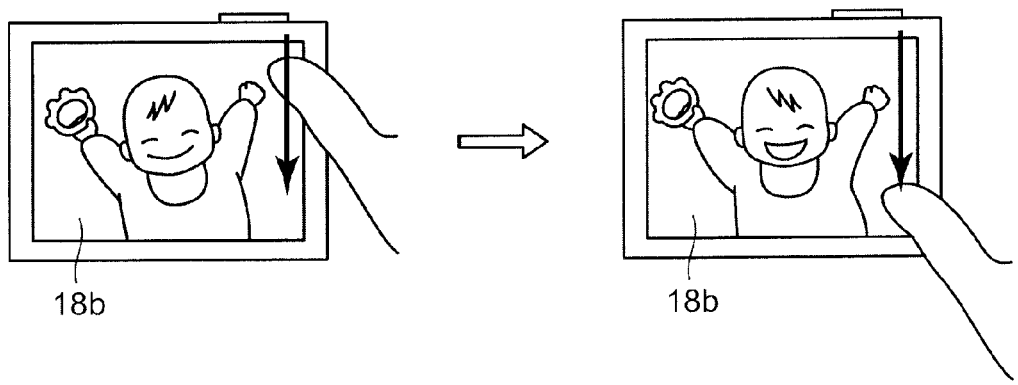
FIG. 9 is a view for describing an example of how to use the digital camera according to the first embodiment.
Figure 10:
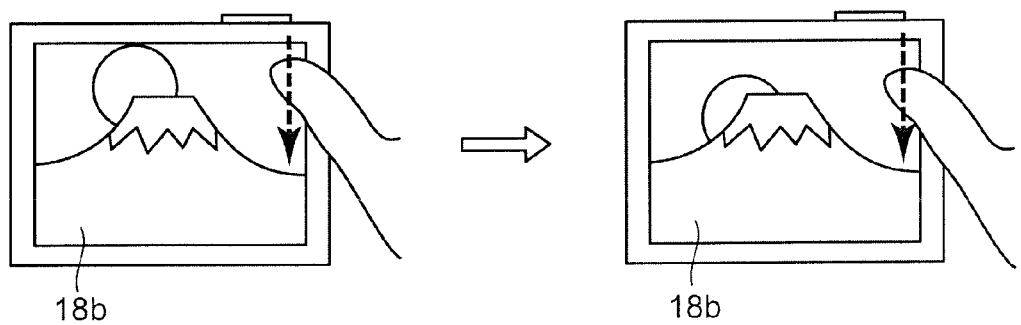
FIG. 10 is a view for describing another example of how to use the digital camera according to the first embodiment.
Figure 11:
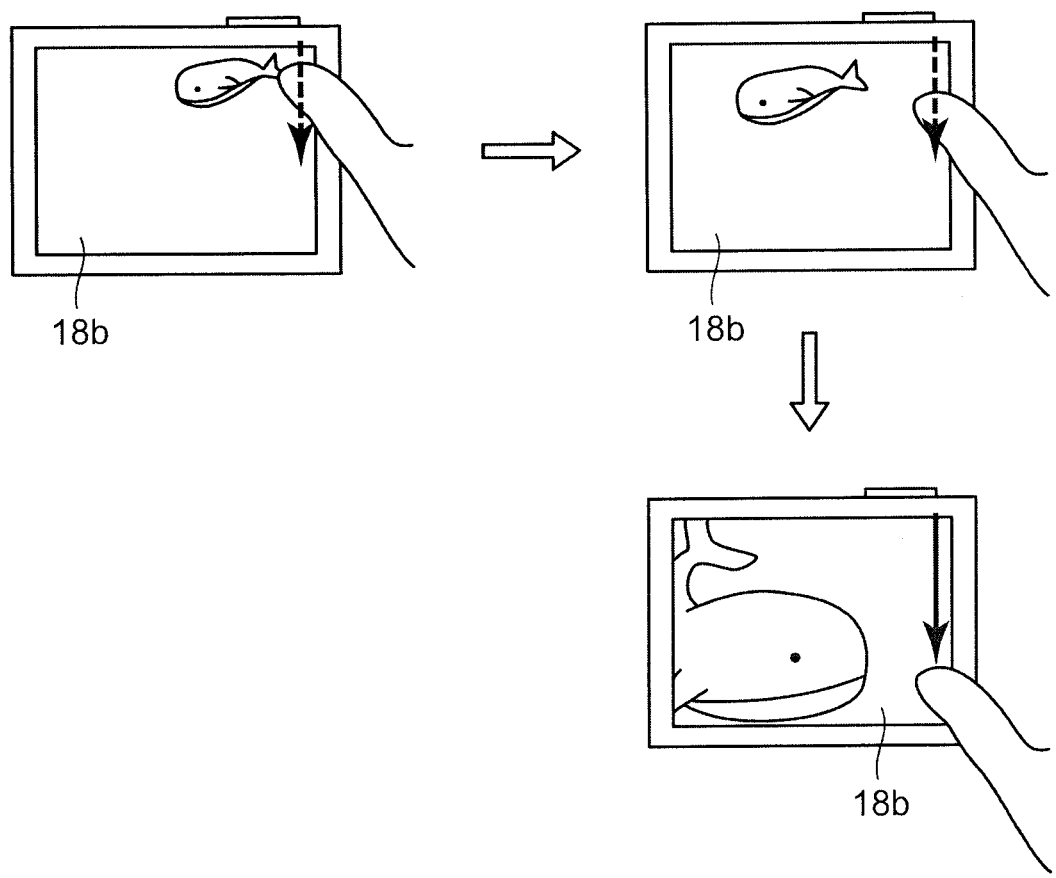
FIG. 11 is a view for describing still another example of how to use the digital camera according to the first embodiment.

The digital camera 1 according to the embodiment can be used as follows. For example, as shown in FIG. 9, when taking photos of an actively moving baby who is altering his or her facial expression rapidly, the user slides his or her finger on the touch panel 18b relatively fast so that shooting is performed at a relatively high frequency. On the other hand, as shown in FIG. 10, when taking photos of a sunset scene changing slowly, the user slides his or her finger on the touch panel 18b relatively slowly so that shooting is performed at a relatively low frequency. Further, as shown in FIG. 11, suppose that photos of fish coming close from afar at an aquarium are taken. In this case, when the fish is far away, since the image change is small, the user slides his or her finger on the touch panel 18b relatively slowly so that shooting is performed at a relatively low frequency. Then, when the fish comes close, the user slides his or her finger on the touch panel 18b relatively fast so that shooting is performed at a relatively high frequency. Thus, according to the first example embodiment, the user can reflect his or her intention of continuous shooting in the sequential shooting speed and timing, thereby changing the speed of the sequential shooting or to freely select shooting timing.

Referring back to FIG. 6, photos continuously shot from step S304 to step S308 or photos continuously shot from step S311 to step S314 may be recorded in the recording part 17 as a group of sequentially shot images. When the photos are recorded as a group of photos, the group of photos are associated with one another. This makes it easy to organize the photos.

In the shooting operations according to the first example embodiment, the operation for initiating the first shot is a press of the release button or a touch release. These release operations are widely available and familiar to the user, and are not different from conventional shooting operations. Therefore, it is ensured that the operation for the first shot can be carried out conventionally. In addition, in the first example embodiment, subsequent sequential shots can be taken shortly after such conventional first shot operations, at timings desired by the user. In other words, the advanced shooting provided by the first example embodiment can be performed following conventional shooting methods that should be familiar to most users.

[Second Embodiment]

A second example embodiment of the present invention will be described. Here, a point different from the first embodiment will be described. The same parts are given the same reference numerals to omit redundant description thereof. As in an example shown in FIG. 12, the digital camera 1 according to this second example embodiment is configured to operate in the same way as the first embodiment when the user slides his or her finger while touching, with the finger, an end of the display part 18a, i.e., the end of the touch panel 18b. The configuration of the digital camera 1 according to this second example embodiment is the same as that in the first example embodiment described with reference to FIG. 1.

The operation of the digital camera 1 according to the second example embodiment will now be described. The main flow described with reference to FIG. 4 and the playback mode operation described with reference to FIG. 5 are the same as those in the first example embodiment. A shooting mode operation performed by the signal processing control part 11 according to the second example embodiment will be described with reference to a flowchart shown in FIG. 13.

In step S401, the signal processing control part 11 displays a live view on the display part 18a. In step S402, the signal processing control part 11 determines whether the release button is pressed. When determining that the release button is pressed, the signal processing control part 11 performs a shooting operation in step S403. After that, the processing proceeds to step S408, described later.

When determining in step S402 that the release button is not pressed, the signal processing control part 11 determines in step S404 whether the touch panel 18b is touched. When it is determined in step S404 that the touch panel 18b is not touched, the processing proceeds to step S408, described later. On the other hand, when it is determined in step S404 that the touch panel 18b is touched, the signal processing control part 11 determines in step S405 whether the touch position is a screen end. When determining that the screen end is not touched, the signal processing control part 11 performs in step S406 a focusing operation on the touch position portion of a shooting operation. After that, the processing proceeds to step S408, described later.

When determining in step S405 that the screen end is touched, the signal processing control part 11 performs in step S407 a slide touch shooting operation according to the embodiment. This slide touch shooting operation will be described later with reference to FIG. 14. After completion of the slide touch shooting operation, the processing proceeds to step S408. In step S408, the signal processing control part 11 determines whether the shooting mode is continued, as already described above. When it is determined in step S408 that the shooting mode is continued, the processing returns to step S401. On the other hand, when it is determined in step S408 that the shooting mode is not continued, the processing returns to the main flow (at step S103) described with reference to FIG. 4.

The slide touch shooting operation according to the second example embodiment will now be described with reference to FIG. 14. In step S501, the signal processing control part 11 displays a live view on the display part 18a. In step S502, the signal processing control part 11 determines whether the touch panel 18b is touched. When it is determined that the touch panel 18b is not touched, the processing returns (at step S408) to the flow described with reference to FIG. 13. On the other hand, when it is determined that the touch panel 18b is touched, the signal processing control part 11 determines in step S503 whether the touch position is continuously slid in the same direction. When it is determined that the touch position is not slid in the same direction, the processing returns to step S501. On the other hand, when it is determined that the touch position is slid in the same direction, the signal processing control part 11 determines in step S504 whether the touch position reaches an end opposite to the end (e.g. top and bottom ends, or left and right ends) of the touch panel 18b detected in step S405, i.e., the opposite end on the screen of the display part 18a. When it is determined that the touch position reaches the opposite end, the processing returns to the flow (at step S408) described with reference to FIG. 13.

On the other hand, when it is determined that the touch position does not reach the end, the signal processing control part 11 determines in step S505 whether the touch position is a predetermined position. When it is determined that the touch position is not the predetermined position, the processing returns to step S501. On the other hand, when it is determined that the touch position is the predetermined position, the signal processing control part 11 performs a shooting operation in step S506. After that, the processing returns to step S501.

Figure 12:
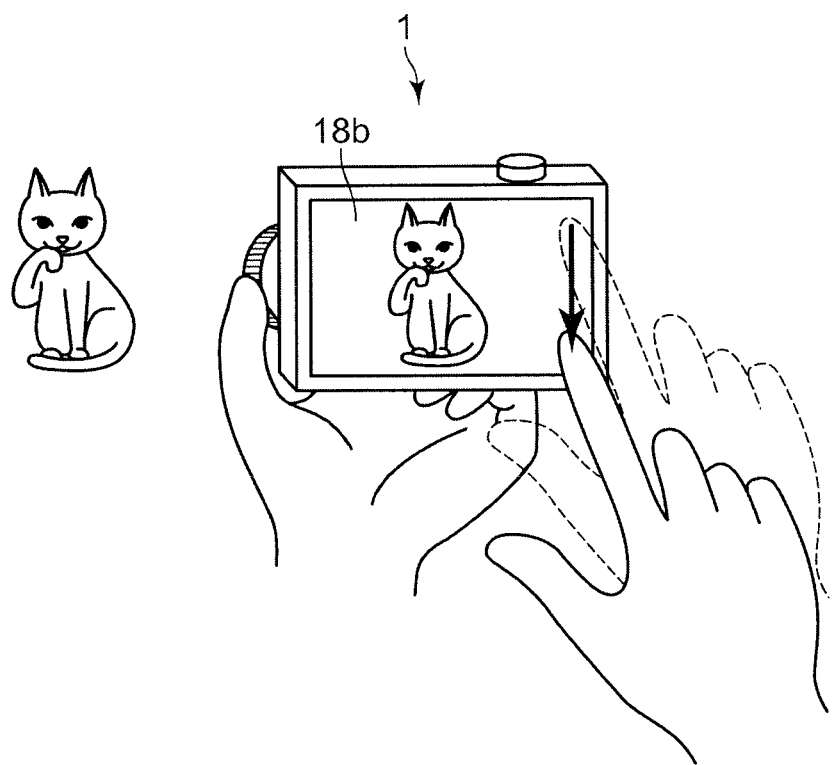
FIG. 12 is a schematic view showing a state of operating the digital camera according to a second embodiment.

According to the second example embodiment, for example, as shown in FIG. 12, when the user slides his or her finger from a screen end of the display part 18a, i.e., from an end of the touch panel 18b, the digital camera 1 performs or does not perform a shooting operation depending on the movement of this finger. Here, as the predetermined position in the determination of step S409, for example, ten points are preset at regular intervals along the screen edge. In this case, ten image shots are taken with the digital camera 1 while the user moves his or her finger from a top corner to a bottom corner along the screen edge. The user can give instructions to the digital camera 1 about shooting timings by tracing the ten points with the finger. When the user lifts the finger off the touch panel 18b along the way, or when the touch position reaches the opposite end such as the corner, a sequence of sequential shots are completed.

The setting of ten points as the above-mentioned predetermined position is, of course, just an example, and more points or fewer points may be set. Further, the predetermined positions may be arranged at various intervals rather than at regular intervals. In the example shown in FIG. 12, the finger is slid along the side of the right edge of the display part 18a, but it is not limited to the right edge, and the left edge, the upper edge, or the lower edge may also be used. Further, for example, the same holds true with a case where the finger is slid from the center of the upper side toward the center of the lower side of the display part 18a through the center of the screen. It may be preset in the digital camera 1 or configured by the digital camera 1 to allow the user to select as to which position is touched to perform sequential shooting. In addition, any mark may be displayed corresponding to the above predetermined position on the display part 18a. When this mark is displayed, the user can carry out operations while recognizing where to move the finger touching the touch panel 18b to perform a shooting operation.

Since a subject to be shot is rarely located at the screen end, the foregoing user inputs will not be confused with existing touch screen user operations, and normal touch release operations can still be made. As a result, the user can carry out operations distinguished from the normal touch release without confusion. Note that the ends of the touch screen are determined by extracting the coordinates of the four sides or four corners of the touch panel 18b. It is difficult for the user to touch the perfect end accurately because of the roundness and breadth of the finger with which the user touches the end. Therefore, even if the touch position is located inwardly by a length of the finger's breadth (e.g., 5 mm or 1 cm), the touch position is determined to be an end. When the size of the touch panel 18b is approximately three inches, the touch point can be regarded as an end adequately even if it is located inwardly by the length of the finger's breadth. Thus, "touching an end" or "touching a predetermined point" can be interpreted as touching within a predetermined distance from an end or touching within a predetermined distance of a predetermined point.

[Third Embodiment]

Figure 15:
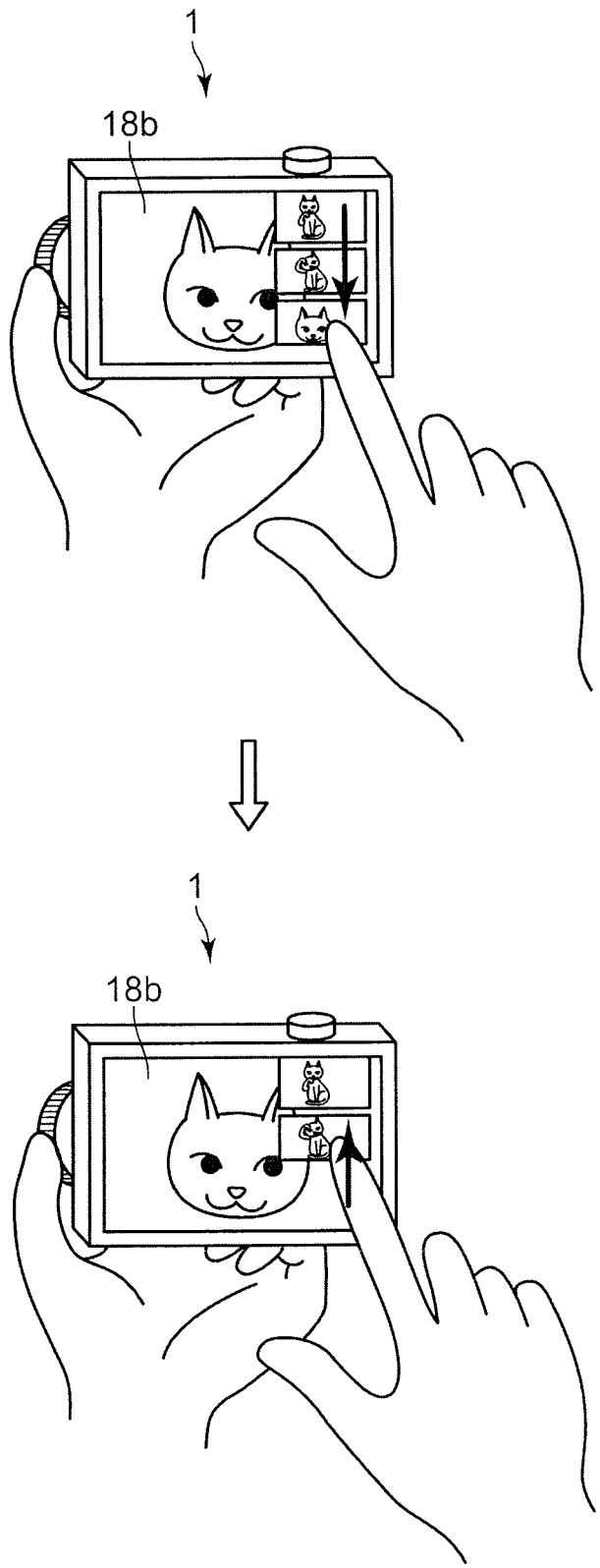
FIG. 15 is a schematic view showing a state of operating the digital camera according to a third embodiment.

A third example embodiment of the present invention will now be described. Here, a point different from the second example embodiment will be described. The same parts are given the same reference numerals to omit redundant descriptions. As in the second embodiment, the digital camera 1 according to this embodiment is configured so that when a screen end of the display part 18a is touched, for example, with a finger and the touch position is slid in parallel with the right screen side (as shown in FIG. 15, though this may be checked with respect to other screen sides in other embodiments), continuous shooting is performed according to the movement of the finger. In this case, as in an example shown in FIG. 15, shot images are displayed on the display part 18a as thumbnails in positions each of which corresponds to the touch position. Further, among the thumbnails, when the touch position is slid to the previous image displayed before the latest image, i.e., when the touch position is taken back to the previous image, the latest image is not recorded. Then, when the touch position is slid again in a direction to give an instruction of shooting, next shooting is performed.

Figure 13:
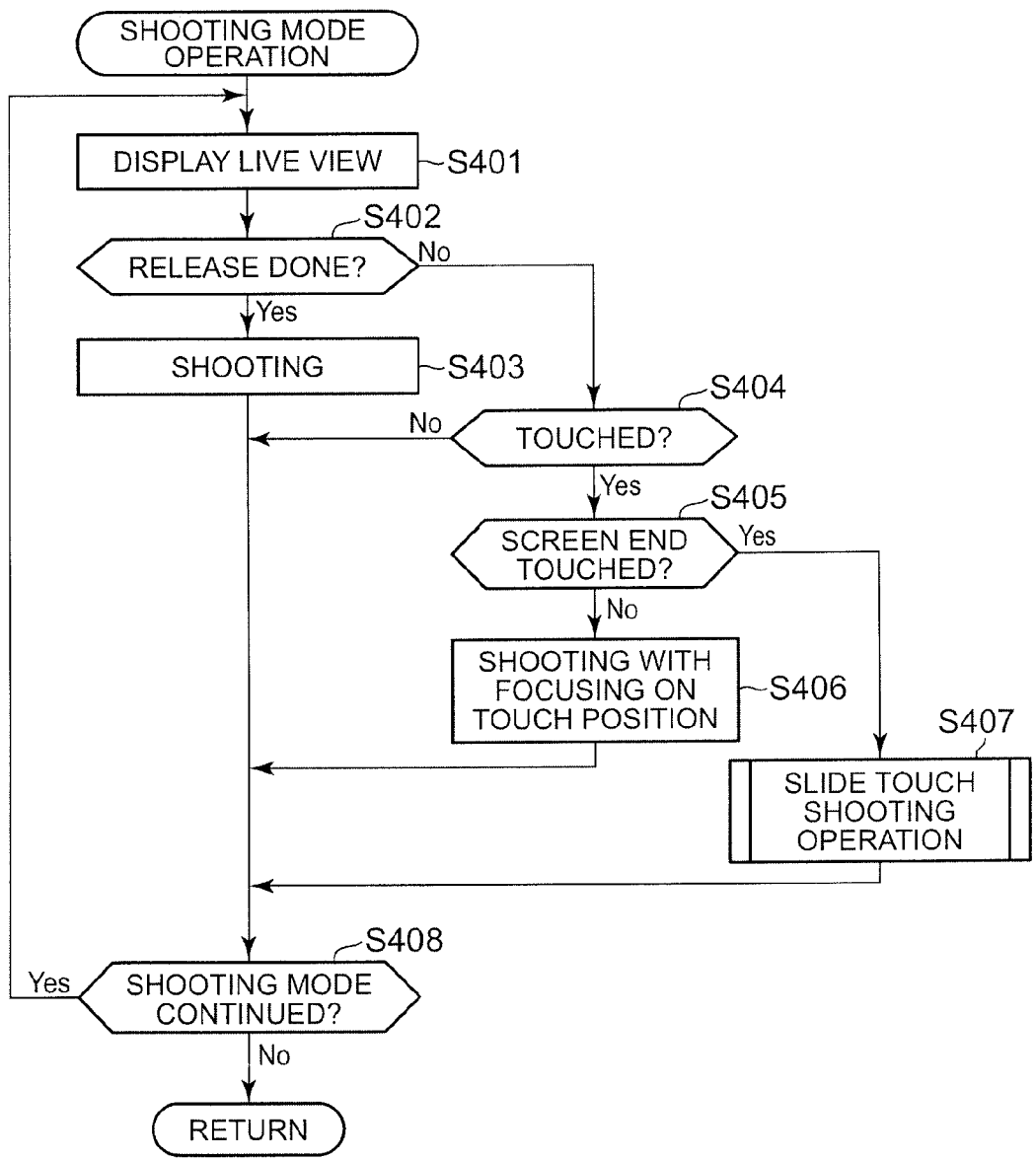
FIG. 13 is a flowchart representing an example of a shooting mode operation according to the second embodiment.
Figure 16:
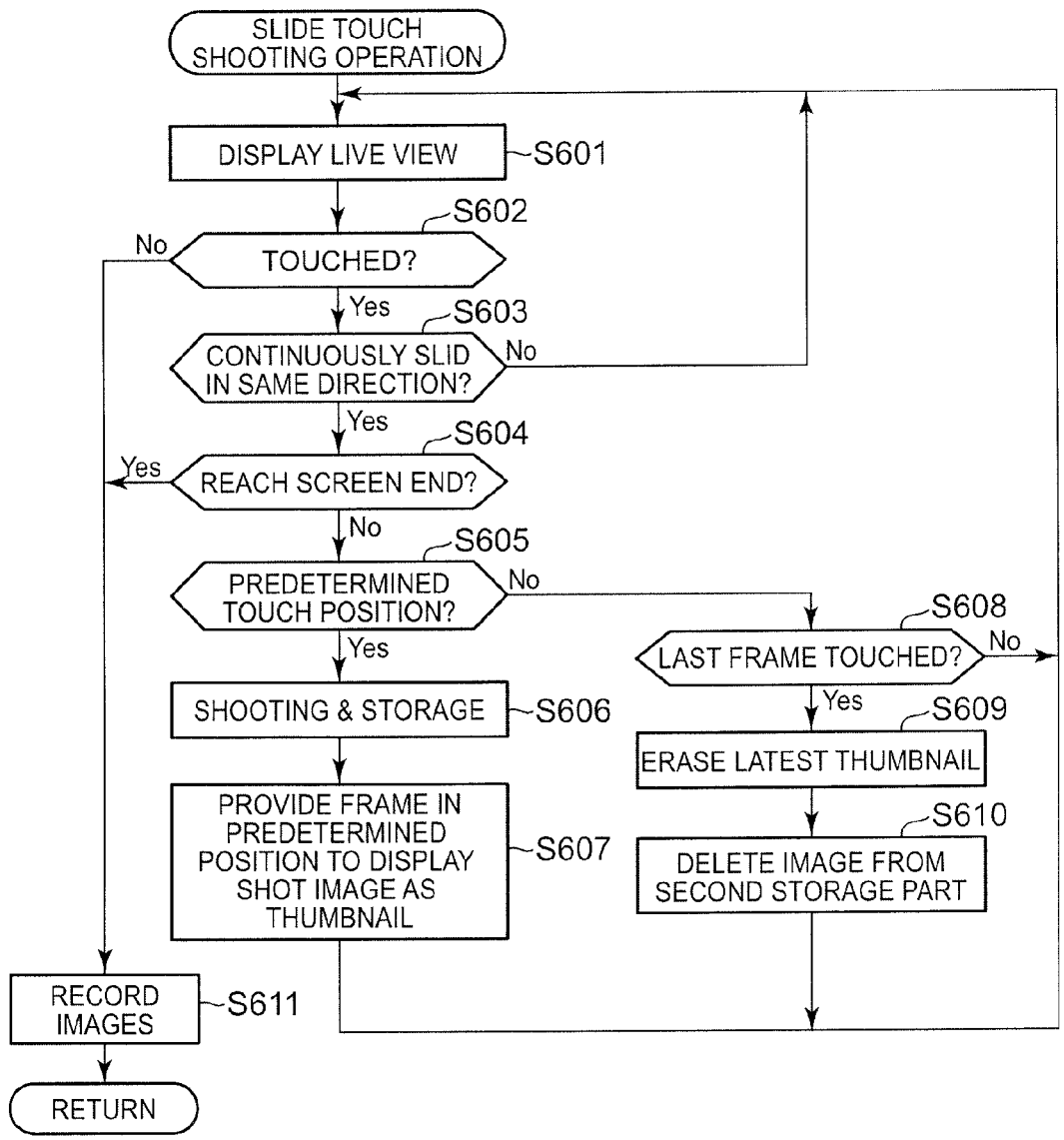
FIG. 16 is a flowchart, representing an example of a slide touch shooting operation according to the third embodiment.

The operation of the digital camera 1 according to the third example embodiment will now be described. The main flow described with reference to FIG. 4 and the playback mode operation described with reference to FIG. 5 are the same as those in the first example embodiment. As for the shooting mode operation according to the embodiment, portions described with reference to FIG. 13 are the same as those in the second example embodiment. The embodiment is different from the second example embodiment in the slide touch shooting operation. A slide touch shooting operation according to the third example embodiment will be described with reference to a flowchart shown in FIG. 16.

In step S601, the signal processing control part 11 displays a live view on the display part 18a. In step S602, the signal processing control part 11 determines whether the touch panel 18b is touched. When it is determined that the touch panel 18b is not touched, the processing proceeds to step S611, described later. On the other hand, when it is determined that the touch panel 18b is touched, the signal processing control part 11 determines in step S603 whether the touch position is continuously slid in the same direction. When it is determined that the touch position is not slid in the same direction, the processing returns to step S601. On the other hand, when it is determined that the touch position is slid in the same direction, the signal processing control part 11 determines in step S604 whether the touch position reaches a screen end. When it is determined that the touch position reaches the end, the processing proceeds to step S611, described later.

On the other hand, when it is determined that the touch position does not reach the end, the signal processing control part 11 determines in step S605 whether the touch position is a predetermined position. Here, the predetermined position is, for example, set to the barycentric position of each of the thumbnails displayed at regular intervals as shown in FIG. 15. When it is determined that the touch position is the predetermined position, the signal processing control part 11 performs a shooting operation and stores the shot image in the second storage part 14b in step S606. After that, in step S607, the signal processing control part 11 provides a frame in the predetermined position on the display part 18a to display the image shot in step S606 in the frame as a thumbnail. After that, the processing returns to step S601.

When it is determined in step S605 that the touch position is not the predetermined position, the processing proceeds to step S608. In step S608, the signal processing control part 11 determines whether the previously displayed frame is touched. When it is determined that the previously displayed frame is not touched, the processing returns to step S601. On the other hand, when it is determined that the previously displayed frame is touched, the signal processing control part 11 erases in step S609 the latest thumbnail displayed on the display part 18a. Then, the signal processing control part 11 deletes in step S610 the image erased in step S609 from the second storage part 14b. After that, the processing returns to step S601.

In step S611, the signal processing control part 11 records, in the recording part 17 as a group of sequentially shot images, shot images acquired in a sequence of continuous shooting operations and stored in the second storage part 14b. After that, the processing returns to the flow (at step S408) described with reference to FIG. 13.

According to the third example embodiment, for example, as shown in FIG. 15, the digital camera 1 carries out sequential shooting operations at timings desired by the user while displaying shot images as thumbnails. The user can continue continuous shooting while checking on the shot images as thumbnails. Further, when a user determines that a shot image is unwanted (for example, because the image was shot at bad timing), the user can moves the touched finger back to the untouched state to erase and delete the last image. That is, at this time, the digital camera 1 can delete, from the second storage part 14b, the image determined to be unwanted. As a result, the unwanted image is removed from the image group to be stored as the group of sequentially shot images. This addresses the problem of too many images that often occurs upon sequential shooting by permitting the user to delete an unwanted image immediately. Particularly, when the subject is an animal or a child, since the subject moves unexpectedly, the timing of sequential shooting may be missed, resulting in taking a massive number of unwanted photos. However, according to the third example embodiment, any unwanted photo can be deleted during shooting.

Figure 17A:
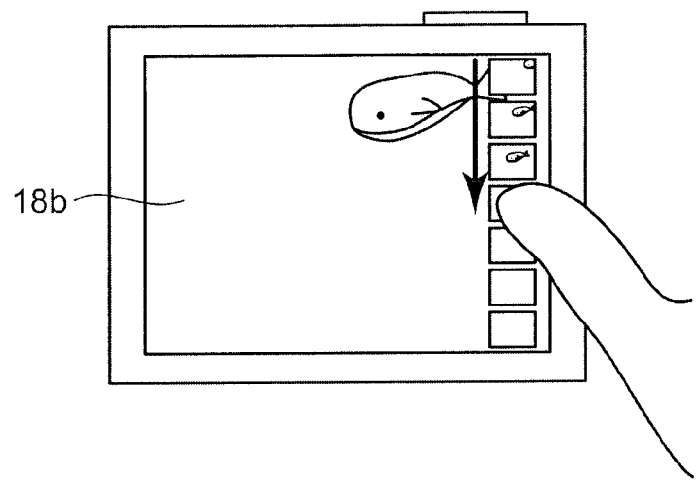
FIG. 17A is a schematic view showing a state of operating the digital camera according to a modification of the third embodiment.
Figure 17B:
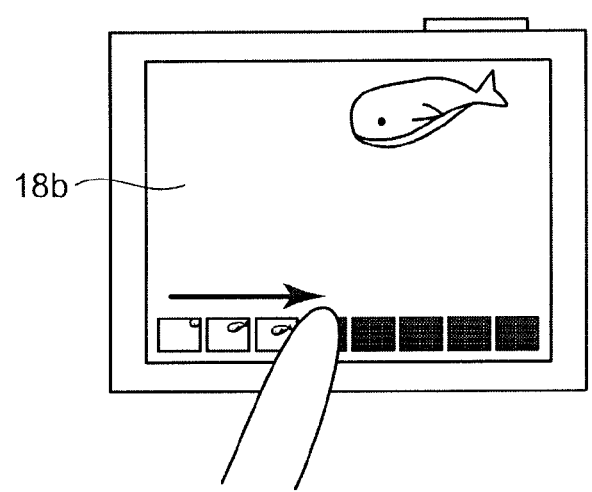
FIG. 17B is a schematic view showing a state of operating the digital camera according to another modification of the third embodiment.
Figure 17C:
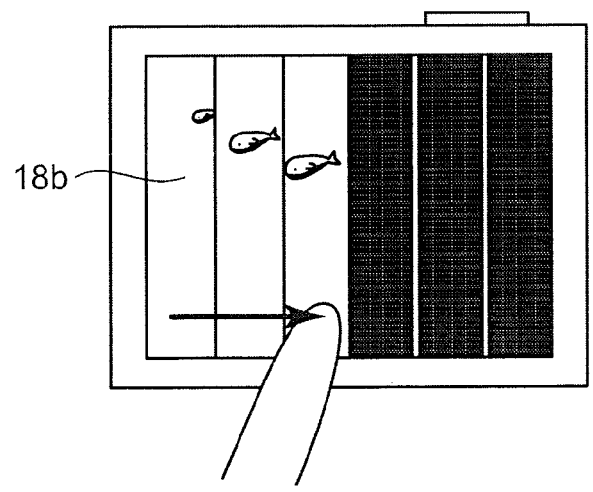
FIG. 17C is a schematic view showing a state of operating the digital camera according to still another modification of the third embodiment.

As a modification of the third example embodiment, for example, as schematically shown in FIG. 17A, the digital camera 1 may be configured so that a frame without any image is provided in advance, and when the user touches this frame to perform shooting, a thumbnail image is displayed in the frame. Further, as shown in FIG. 17B, the frames for displaying thumbnails may be arranged side by side, rather than one below the other as in FIG. 17A. In addition, as shown in FIG. 17C, the digital camera 1 may be configured so that partial images are displayed one after another in strip areas corresponding to touch positions and a series of photos is eventually displayed as one image. In the case shown in FIG. 17C, the touch position may be slid in the middle of the display part 18a as well as along the side.

[Fourth Embodiment]

Figure 18:
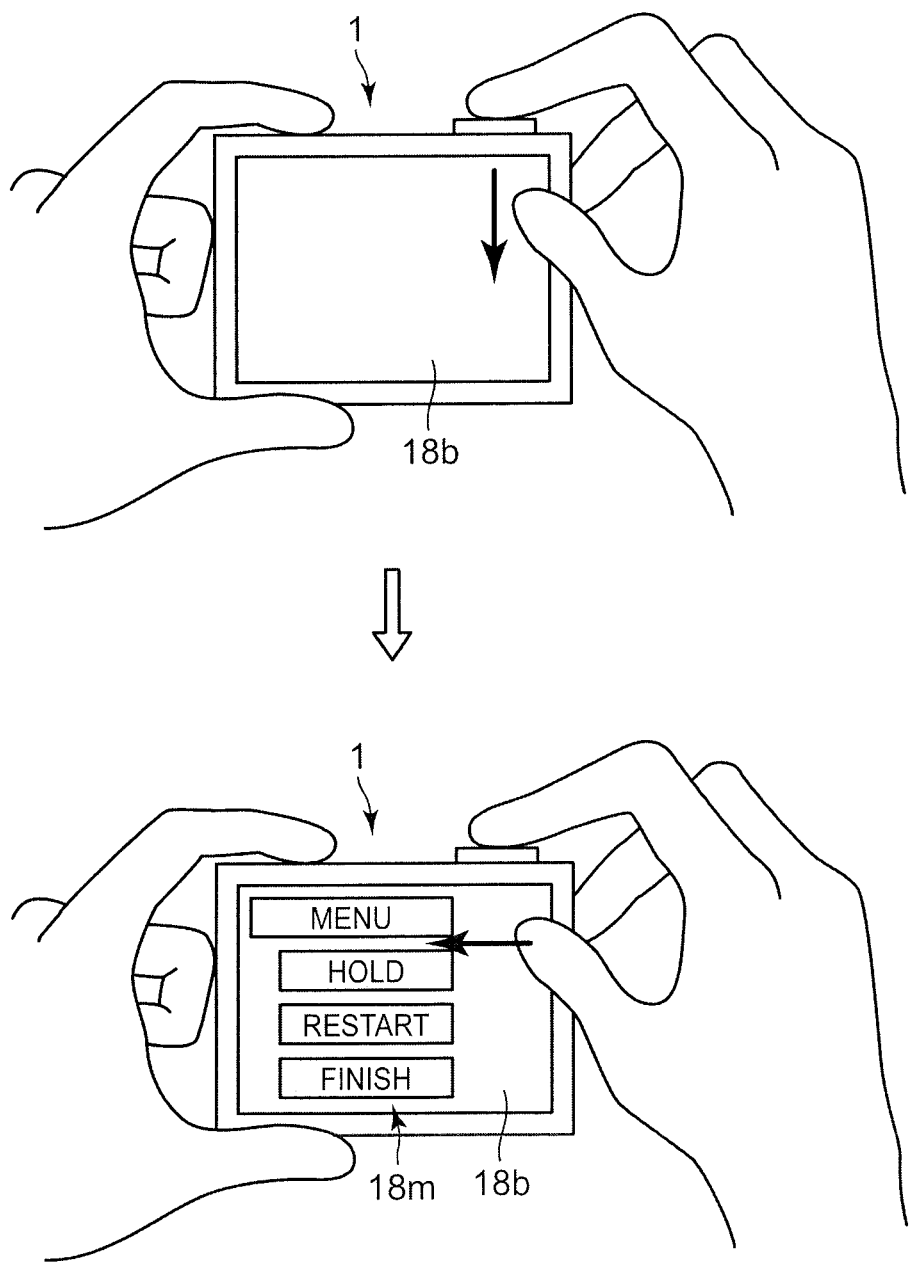
FIG. 18 is a schematic view showing a state of operating the digital camera according to a fourth embodiment.

A fourth example embodiment of the present invention will now be described. Here, a point different from the second example embodiment will be described. The same parts are given the same reference numerals to omit redundant descriptions. As in the second example embodiment, as shown in FIG. 18, the digital camera 1 according to this fourth example embodiment is configured so that when the touch panel 18b is touched with a finger along, for example, a right end of the screen of the display part 18a, and the touch position is slid, continuous shooting is performed according to the movement of the finger. (Note that the shutter release button need not be held in this embodiment.) In this case, as shown in the lower part of FIG. 18, when the finger is slid in a direction toward the center of the screen of the display part 18a (to the left in FIG. 18), a menu 18m appears. When the user selects "Hold" on this menu, the operation is stopped temporarily. After that, even when the user lifts his or her finger off the touch panel, the continuous operation is restarted once "Restart" is selected. According to the fourth example embodiment, even when the user lifts his or her finger off the touch panel 18b between operations in a sequence of continuous shooting operations, multiple photos shot as a group of sequentially shot images are recorded.

Figure 19:
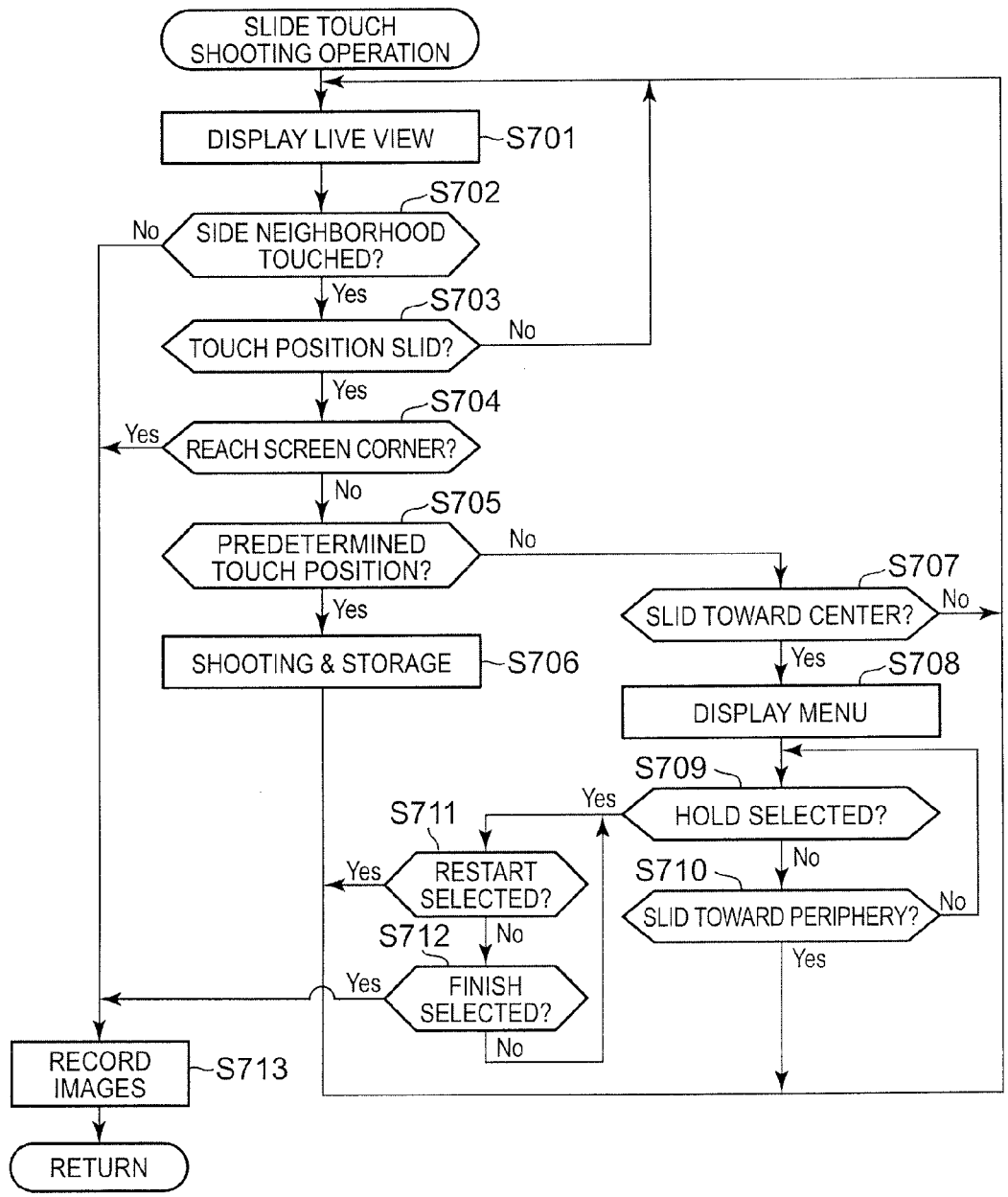
FIG. 19 is a flowchart representing an example of a slide touch shooting operation according to the fourth embodiment.

The operation of the digital camera 1 according to the fourth example embodiment will be described. The main flow described with reference to FIG. 4 and the playback mode operation described with reference to FIG. 5 are the same as those in the first example embodiment. As for the shooting mode operation according to the embodiment, portions described with reference to FIG. 13 are the same as those in the second example embodiment. The embodiment is different from the second example embodiment in the slide touch shooting operation. A slide touch shooting operation according to the embodiment will be described with reference to a flowchart shown in FIG. 19.

In step S701, the signal processing control part 11 displays a live view on the display part 18a. In step S702, the signal processing control part 11 determines whether a portion in the neighborhood of (e.g., within a predetermined distance of) a side of the touch panel 18b is touched. When it is determined that the side neighborhood is not touched, the processing proceeds to step S713, described later. On the other hand, when it is determined that the side neighborhood is touched, the signal processing control part 11 determines in step S703 whether the touch position is slid. When it is determined that the touch position is not slid, the processing returns to step S701. On the other hand, when it is determined that the touch position is slid, the signal processing control part 11 determines in step S704 whether the touch position reaches an end or corner of the screen of the display part 18a, i.e., a corner of the touch panel 18b. When it is determined that the touch position reaches the corner, the processing proceeds to step S713, described later.

On the other hand, when it is determined that the touch position does not reach the corner, the signal processing control part 11 determines in step S705 whether the touch position is a predetermined position. When determining that the touch position is the predetermined position, the signal processing control part 11 performs a shooting operation and stores the shot image in the second storage part 14b in step S706. After that, the processing returns to step S701.

When it is determined in step S705 that the touch position is not the predetermined position, the processing proceeds to step S707. In step S707, the signal processing control part 11 determines whether the touch position is slid in a direction toward the center of the display part 18a. When it is determined that the touch position is not slid in the direction toward the center, the processing returns to step S701. On the other hand, when it is determined that the touch position is slid in the direction toward the center, the signal processing control part 11 displays in step S708 the menu 18m as shown in FIG. 18 on the display part 18a. In step S709, the signal processing control part 11 determines whether Hold is selected. When determining that Hold is not selected, the signal processing control part 11 determines in step S710 whether the touch position is slid in a direction toward the periphery of the display part 18b. When determining that the touch position is slid in the direction toward the periphery, the signal processing control part 11 makes the menu 18m disappear and returns the processing to step S701. On the other hand, when it is determined that the touch position is not slid in the direction toward the periphery, the processing returns to step S709.

When determining in step S709 that Hold is selected, the signal processing control part 11 determines in step S711 whether Restart is selected. When determining that Restart is selected, the signal processing control part 11 makes the menu 18m disappear and returns the processing to step S701. On the other hand, when determining that Restart is not selected, the signal processing control part 11 determines in step S712 whether Finish is selected. When it is determined that Finish is not selected, the processing returns to step S711. On the other hand, when it is determined that Finish is selected, the processing proceeds to step S713.

In step S713, the signal processing control part 11 records, in the recording part 17, a group of sequentially shot images stored in the second storage part 14b. After that, the processing returns to the flow at step S408 described with reference to FIG. 13.

According to the fourth example embodiment, the user can lift his or her finger off the touch panel during loop processing of step S711 and step S712 after "Hold" is selected. Thus, the user can get the convenience of saving associated photos as a group of photos even when they momentarily pause (or Hold) the continuous shooting. Note that on the menu display, an operating guide may also be displayed concurrently. Further, marks rather than words may, of course, be used on the menu. In addition, the same function of selecting "Hold" may be implemented by using a "Hold" switch as one of the elements on the operation part 16

[Others]

Figure 20:
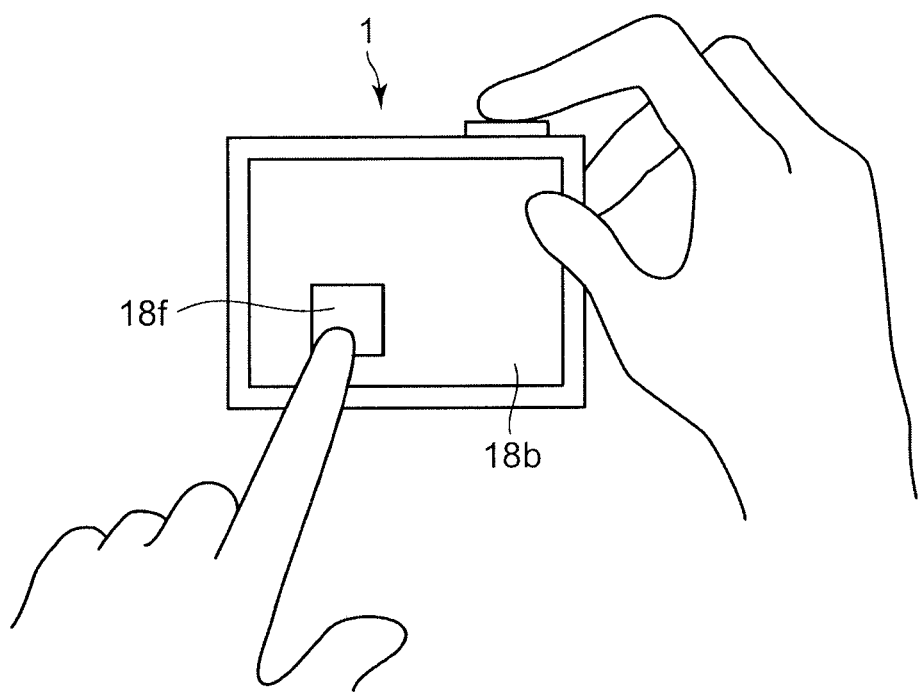
FIG. 20 is a schematic view showing a state of operating the digital camera according to a modification.

Various features of the aforementioned example embodiments can be combined. Further, in the aforementioned embodiments, the digital camera 1 may be configured that when the user touches the touch panel 18b even during a sequential shooting operation, a focusing area 18f is set anchored to the touch area, as shown in FIG. 20, to perform an autofocus operation for focusing on a subject corresponding to the focusing area 18f. In addition, even during the sequential shooting operation, a zoom operation can be performed by operating the operation part 23a or the operation part 23b, or by touching an indication of an operation key displayed on the touch panel 18b. Here, the zoom operation includes optical zoom and digital zoom for operating the zooming part 26a.

Figure 14:
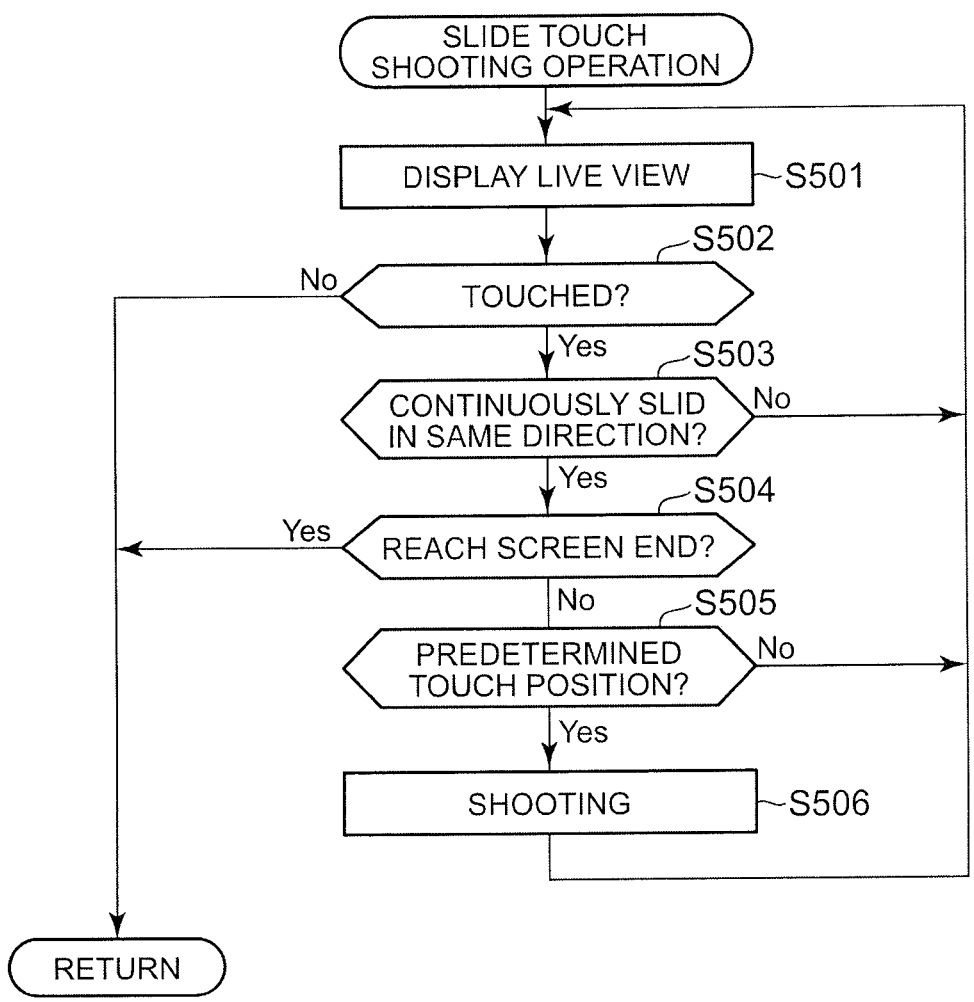
FIG. 14 is a flowchart representing an example of a slide touch shooting operation according to the second embodiment.
Figure 21:
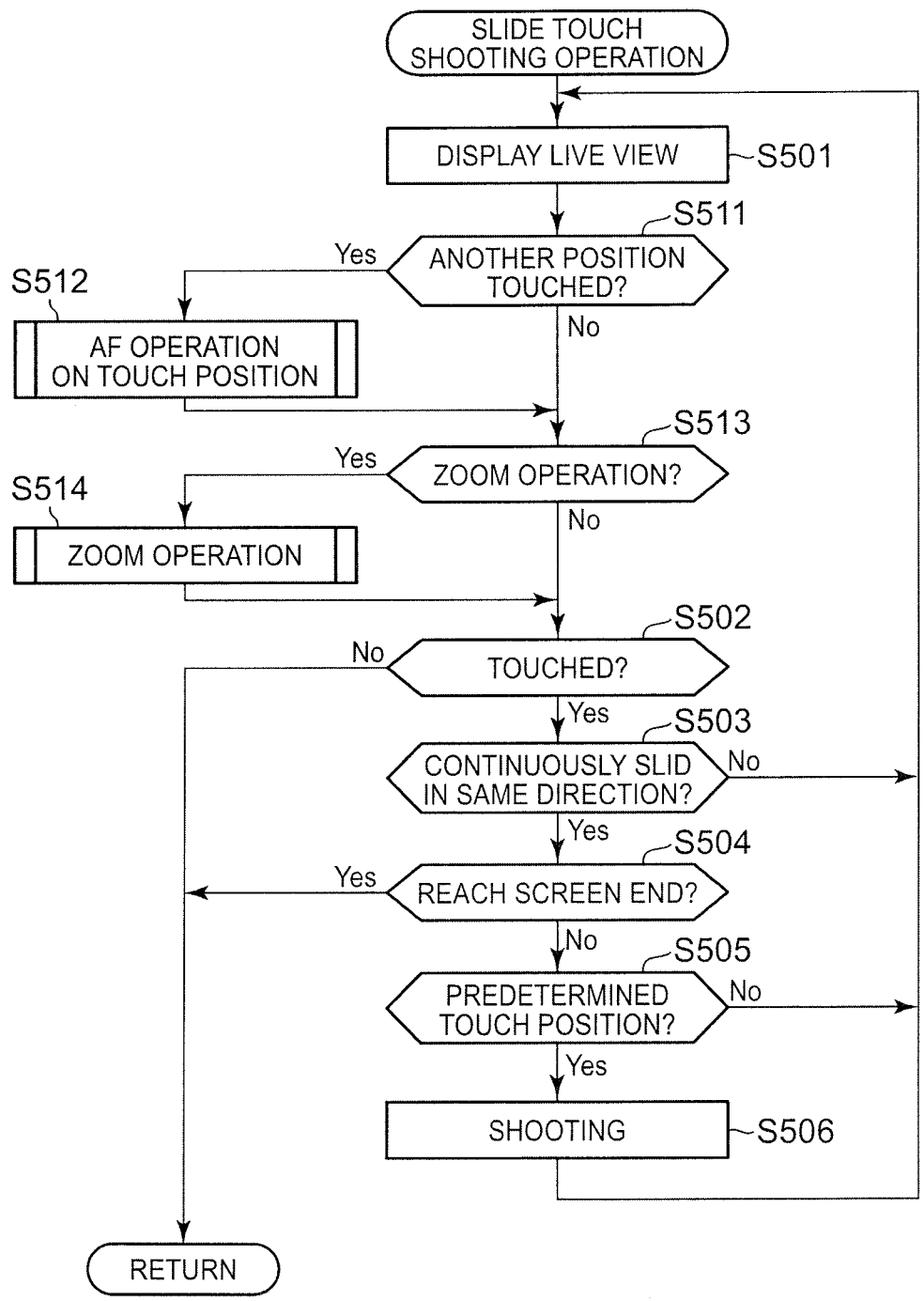
FIG. 21 is a flowchart representing an example of a slide touch shooting operation according to the modification.

To carry out the above-mentioned autofocus (AF) operation and the zoom operation, for example, the flowchart shown in FIG. 14 can be altered as shown in FIG. 21. In other words, as shown in FIG. 21, the following steps S511 to S514 are inserted between step S501 and step S502 in the flowchart shown in FIG. 14.

After displaying a live view on the display part 18a in step S501, the signal processing control part 11 determines in step S511 whether another position is touched. When it is determined that another position is not touched, the processing proceeds to step S513. When it is determined that a position other than the end portion is touched, the signal processing control part 11 carries out in step S512 an autofocus (AF) operation for focusing on the touch position. After that, the processing proceeds to step S513. Since the AF operation in step S512 is not directly related to the present invention and can be carried out by using a known technique, the description thereof will be omitted here.

In step S513, the signal processing control part 11 determines whether a user input for a zoom operation is received. When it is determined that no zoom operation user input is received, the processing proceeds to step S502. When it is determined that a zoom operation user input is received, the signal processing control part 11 performs a zoom operation in step S514. After that, the processing proceeds to step S502. Since the zoom operation in step S514 is not directly related to the present invention and can be carried out by using a known technique, the description thereof will be omitted here. The other processing is the same as the case described with reference to FIG. 14. Further, the same processing can be performed in the second to fourth embodiments as well.

Figure 22A:
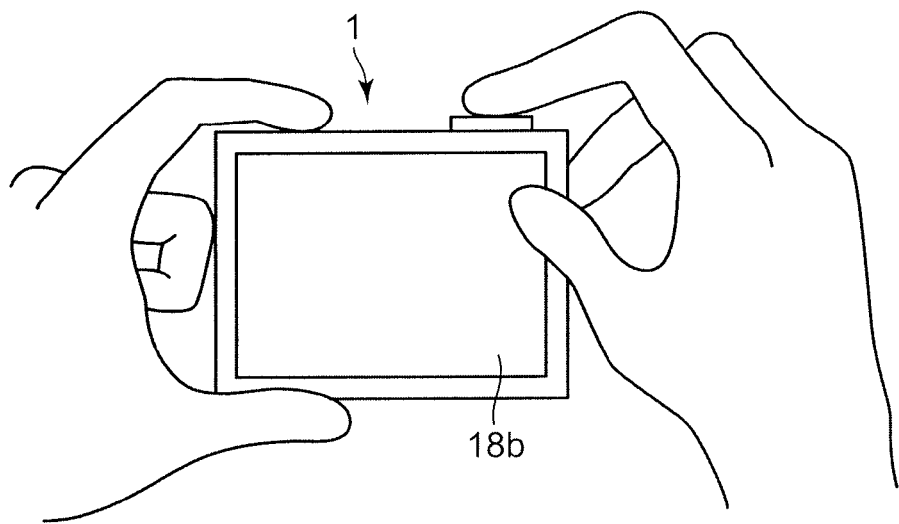
FIG. 22A is a schematic view showing a state of operating the digital camera according to each embodiment.
Figure 22B:
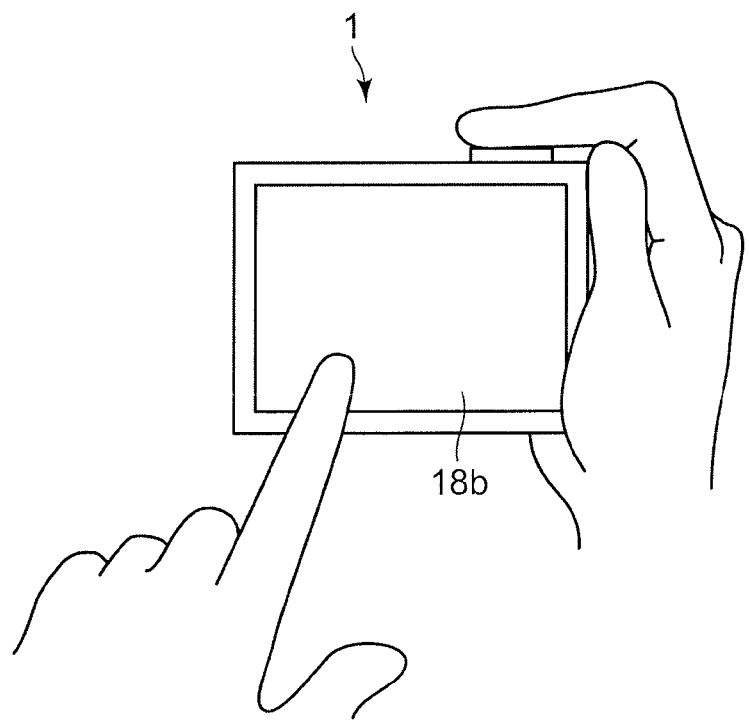
FIG. 22B is a schematic view showing another state of operating the digital camera according to each embodiment.
Figure 22C:
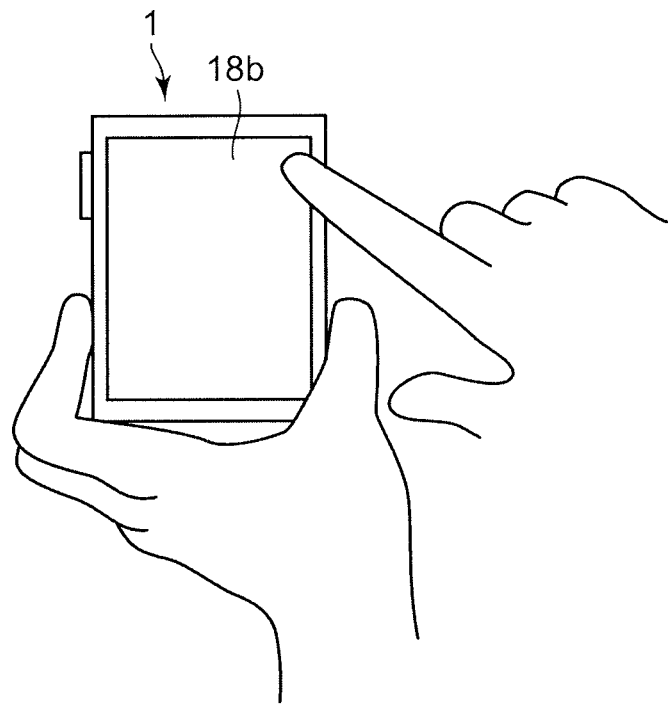
FIG. 22C is a schematic view showing still another state of operating the digital camera according to each embodiment.
Figure 22D:
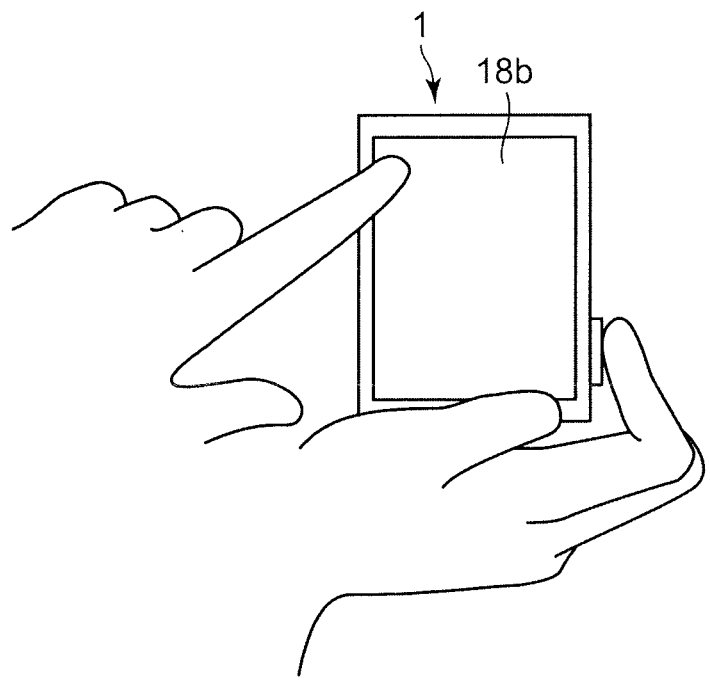
FIG. 22D is a schematic view showing yet another state of operating the digital camera according to each embodiment.

Further, the way the user holds the digital camera 1 in the first example embodiment is not the only way for the user to operate the camera. More specifically, although the touch panel can be operated with the thumb of the right hand while operating the release button with the index finger of the right hand as shown in FIG. 22A, the touch panel may be operated with the left hand instead as shown in FIG. 22B. Further, although the digital camera 1 was described as being held in a horizontal position, this is not necessary. That is, the camera 1 may be held in different vertical positions instead, as shown in FIG. 22C and FIG. 22D. Further, the slide operation along the right side edge of the touch panel for instructing a sequential shooting operation in the second embodiment and the third embodiment may replaced with a slide operation along any one of the other sides of the display screen 18a.

In addition, operations may be changed depending on the attitude of the camera, such as the vertical position or the horizontal position. In this case, the digital camera 1 may be configured so that the signal processing control part 11 detects the attitude of the digital camera 1 using the output of the acceleration sensor 19 to change, according to the attitude, the definition of how the user enters a sequential shooting operation with respect to the coordinates of the touch panel 18b. For example, it may be defined that a sequential shooting operation is done by sliding the touch position always along the rightmost side. In this case, the right side when the digital camera 1 is held in the horizontal position as shown in FIG. 22A and FIG. 22B is different in the position on the touch panel 18*b* from the right side when it is held in the vertical positions as shown in FIG. 22C and FIG. 22D. However, if the attitude of the digital camera is detected based on the output of the acceleration sensor 19 to change the definition of the coordinates of the touch panel 18*b* based on this attitude, the user can trace the right side without regard to the attitude of the camera to operate the digital camera 1 the same way (i.e., the right, hand side of the camera from the user's perspective).

Figure 23A:
FIG. 23A is a view showing a display example of a group of images shot with the digital camera according to each embodiment.
Figure 23B:
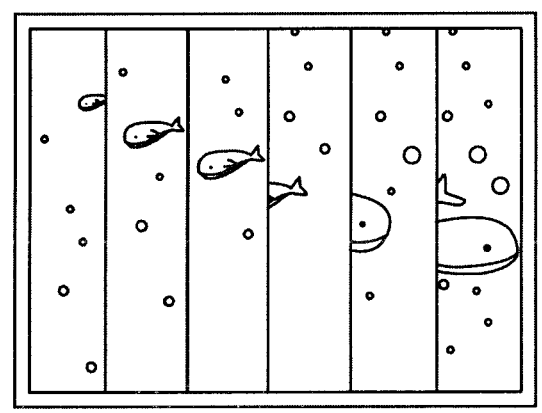
FIG. 23B is a view showing another display example of a group of images shot with the digital camera according to each embodiment.

Further, for example, different methods of displaying a group of sequentially shot images based on the example embodiments are now described. As shown in FIG. 23A, a group of photos can be played back full-screen like a movie. In this case, for example, photos sequentially shot can be updated at regular intervals regardless of the shooting intervals. Alternatively, photos can be updated at time intervals proportional to the shooting time intervals. In this case, the photos are displayed like a stop motion movie. In addition, as shown in FIG. 23B, multiple photos sequentially shot can be combined into one image and displayed as a series of vertical photo strips. In this case, sequentially shot images are displayed as one photo having an uplifting feeling and a story line.

To switch among various kinds of displays, the playback mode operation described with reference to FIG. 5 can, for example, be changed to the operation as shown in a flowchart of FIG. 24. In this playback mode operation, in step S801, the signal processing control part 11 displays, on the display part 18*a*, a list of images recorded in the recording part 17. In step S802, the signal processing control part 11 determines whether enlarged playback is selected. When it is determined in step S802 that the enlarged playback is not selected, the processing returns to step S801. On the other hand, when it is determined in step S802 that the enlarged playback is selected, the signal processing control part 11 determines in step S803 whether a selected photo is a sequentially shot image. When determining that it is not a sequentially shot image, the signal processing control part 11 enlarges the selected image and displays it on the display part 18*a* in step S804. After that, the processing proceeds to step S811, described later.

On the other hand, when determining that the selected photo is a sequentially shot image, the signal processing control part 11 displays in step S805 a screen for allowing the user to select a playback mode on the display part 18*a*. In step S806, the signal processing control part 11 determines whether playback mode 1 is selected. Here, for example, playback mode 1 is a first movie display mode, as shown in FIG. 23A, in which the display is updated at regular time intervals. When determining that playback mode 1 is selected, the signal processing control part 11 displays in step S807 a group of sequentially shot images on the display part 18*a* in playback mode 1. After that, the processing proceeds to step S811, described later.

When determining that playback mode 1 is not selected, the signal processing control part 11 determines in step S808 whether playback mode 2 is selected. Here, for example, playback mode 2 is a second movie display mode, as shown in FIG. 23A, in which the display is updated at intervals proportional to the shooting intervals. When determining that playback mode 2 is selected, the signal processing control part 11 displays in step S809 a group of sequentially shot images on the display part 18*a* in playback mode 2. After that, the processing proceeds to step S811, described later.

When determining that playback mode 2 is not selected, the signal processing control part 11 displays in step S810 the sequential shot images on the display part 18*a* in playback mode 3. Here, for example, playback mode 3 is a display mode, as shown in FIG. 23B, in which a series of photos is displayed in vertical strips across the screen. After that, the processing proceeds to step S811.

In step S811, the signal processing control part 11 determines whether returning to the display of the list of images is selected. The processing repeats step S811 unless returning to the display of the list of images is selected in step S811. On the other hand, when it is determined in step S811 that returning to the display of the list of images is selected, the processing proceeds to step S812. In step S812, the signal processing control part 11 determines whether the playback mode is continued. When it is determined that the playback mode is continued, the processing returns to step S801. On the other hand, when it is determined that the playback mode is not continued, the processing returns to the main flow (at step S103) described with reference to FIG. 4.

As described above, according to the present invention, since the timing of continuous shooting can be visualized as two-dimensional position information, the user can carry out an intuitive operation for sequential shooting at any timing. During sequential shooting, there are constraints due to the processing speed of the signal processing part 11*a* and the capacity of the second storage part 14*b*. However, for example, since the distance from end to end of the display part 18*a* may correspond to room remaining in the second storage part 14*b*, the user can recognize room remaining in the second storage part 14*b* from the distance on the display part 18*a*.

Note that the present invention is not limited wholly to the aforementioned embodiments, and the constituent features can be modified and embodied in the implementation phase without departing from the scope of the invention. Further, arbitrary combinations of multiple constituent features disclosed in the aforementioned embodiments can form various inventions. For example, even when some constituent features are omitted from all the constituent features shown in each of the embodiments, a structure with the constituent features omitted can be extracted as an invention as long as the above-mentioned problems can be solved and the above-mentioned effects can be obtained. Further, constituent features across different embodiments may be combined arbitrarily.

What is claimed is:

1. A method for controlling an imaging device having a touch screen display, the method comprising:
   a) displaying, on the touch screen display, both (1) a live view of images captured by the imaging device and (2) a plurality of frames at intervals spaced by a predetermined amount;
   b) determining whether the touch screen display is being touched at a position corresponding to one of the plurality of frames;
   c) responsive to a determination that the touch screen display is being touched at the position corresponding to the one of the plurality of frames,
      1) performing a first image capturing operation,
      2) displaying a thumbnail of the first image in the one of the plurality of frames, and
      3) storing the first image;
   d) acquiring a new position of a continuous touch input via the touch screen display;
   e) responsive to a determination that the new position of the continuous touch corresponds to a position of a next one of the plurality of frames,
      1) performing another image capturing operation, 2) displaying a thumbnail of the other image in the next one of the plurality of frames, and
3) storing the other image, otherwise, responsive to a determination that the new position of the continuous touch corresponds to a position of the one of the plurality of frames after the continuous touch had left the one of the plurality of frames,
1) removing the display of the thumbnail of the first image from the one of the plurality of frames, and
2) deleting the first image from storage, and otherwise, responsive to a determination that the new position of the continuous touch corresponds to neither the position of a next one of the plurality of frames, nor a position of the one of the plurality of frames after the continuous touch had left the one of the plurality of frames, returning to the act of (d) acquiring a new position of a continuous touch input via the touch screen display.

* * * * *